US012230887B2

(12) United States Patent
Walker et al.

(10) Patent No.: US 12,230,887 B2
(45) Date of Patent: *Feb. 18, 2025

(54) DIELECTRIC ANTENNA ARRAY AND SYSTEM

(71) Applicant: FreeFall 5G, Inc., Tucson, AZ (US)

(72) Inventors: Christopher Kidd Walker, Tucson, AZ (US); Juan Carlos Lopez-Tonazzi, Tucson, AZ (US); Brandon James Swift, Tucson, AZ (US); Marwan M. Krunz, Tucson, AZ (US)

(73) Assignee: FreeFall 5G, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,778

(22) Filed: Jul. 17, 2023

(65) Prior Publication Data

US 2023/0387588 A1 Nov. 30, 2023

Related U.S. Application Data

(63) Continuation of application No. 17/228,453, filed on Apr. 12, 2021, now Pat. No. 11,715,874, which is a (Continued)

(51) Int. Cl.
*H01Q 3/24* (2006.01)
*H01Q 1/24* (2006.01)
(Continued)

(52) U.S. Cl.
CPC ................ *H01Q 3/24* (2013.01); *H01Q 1/24* (2013.01); *H01Q 3/01* (2013.01); *H01Q 13/24* (2013.01); *H01Q 21/06* (2013.01)

(58) Field of Classification Search
CPC ........... H01Q 3/24; H01Q 3/01; H01Q 21/06; H01Q 13/24; H01Q 1/24
See application file for complete search history.

(56) References Cited

U.S. PATENT DOCUMENTS 3,605,102 A 9/1971 Frye
4,274,097 A 6/1981 Kraft et al.
(Continued)

FOREIGN PATENT DOCUMENTS

CA 2503031 C 1/2010
DE 102006007928 A1 8/2007
(Continued)

OTHER PUBLICATIONS

Australian Examination Report for Application No. 2019270825, dated Mar. 11, 2020, 3 pages.
(Continued)

*Primary Examiner* — Hai V Tran
(74) *Attorney, Agent, or Firm* — Matney Legal Group PLLC

(57) ABSTRACT

An example antenna system includes a plurality of dielectric rod stacks and a control circuit. The control circuit includes a plurality of independently controlled output circuit boards. Each independently controlled output circuit board includes a respective dielectric rod stack. The respective dielectric rod stack includes a plurality of respective dielectric rods. The control circuit selects: (i) the dielectric rod stacks, and (ii) the respective dielectric rods of the respective dielectric rod stack to adjust a beam of emitted or received radio frequency (RF) waves.

20 Claims, 21 Drawing Sheets

Related U.S. Application Data continuation of application No. 16/818,504, filed on Mar. 13, 2020, now Pat. No. 10,998,625, which is a continuation of application No. 16/354,671, filed on Mar. 15, 2019, now Pat. No. 10,644,395.

(60) Provisional application No. 62/754,952, filed on Nov. 2, 2018, provisional application No. 62/693,584, filed on Jul. 3, 2018, provisional application No. 62/671,408, filed on May 14, 2018.

(51) Int. Cl.

| | |
|---|---|
| ***H01Q 3/01*** | (2006.01) |
| ***H01Q 13/24*** | (2006.01) |
| ***H01Q 21/06*** | (2006.01) |

(56) References Cited

U.S. PATENT DOCUMENTS

| | | | | |
|---|---|---|---|---|
| 5,506,591 | A | 4/1996 | Dienes | |
| 6,104,343 | A | 8/2000 | Brookner et al. | |
| 6,208,308 | B1 * | 3/2001 | Lemons | H01Q 13/24 343/768 |
| 6,266,025 | B1 * | 7/2001 | Popa | H01Q 19/08 343/785 |
| 6,317,095 | B1 | 11/2001 | Teshirogi et al. | |
| 6,476,773 | B2 * | 11/2002 | Palmer | H01Q 3/20 343/700 MS |
| 6,476,776 | B1 | 11/2002 | Kurby | |
| 6,774,852 | B2 * | 8/2004 | Chiang | H01Q 1/242 343/846 |
| 7,786,946 | B2 | 8/2010 | Diaz et al. | |
| 8,130,165 | B2 | 3/2012 | Lindmark | |
| 9,306,262 | B2 | 4/2016 | Puzella et al. | |
| 2001/0033251 | A1 * | 10/2001 | Rudish | H01Q 1/36 343/895 |
| 2002/0024468 | A1 | 2/2002 | Palmer et al. | |
| 2002/0030632 | A1 | 3/2002 | Popa et al. | |
| 2003/0201940 | A1 | 10/2003 | Chiang et al. | |
| 2005/0219126 | A1 * | 10/2005 | Rebeiz | H01Q 25/008 343/700 MS |
| 2007/0069965 | A1 * | 3/2007 | Sarehraz | H01Q 1/248 343/770 |
| 2008/0036683 | A1 | 2/2008 | Schadler | |
| 2009/0231221 | A1 | 9/2009 | Huang et al. | |
| 2012/0038540 | A1 | 2/2012 | Jacob et al. | |
| 2012/0224805 | A1 | 9/2012 | Doerr | |
| 2015/0200459 | A1 | 7/2015 | Wang et al. | |
| 2017/0018856 | A1 | 1/2017 | Henry et al. | |
| 2017/0033464 | A1 | 2/2017 | Henry et al. | |
| 2017/0085003 | A1 | 3/2017 | Johnson et al. | |
| 2017/0093693 | A1 | 3/2017 | Barzegar et al. | |
| 2017/0179585 | A1 | 6/2017 | Kaufmann et al. | |

FOREIGN PATENT DOCUMENTS

| | | | |
|---|---|---|---|
| JP | H082005 | B2 | 1/1996 |
| NL | 1034102 | C2 | 1/2008 |

OTHER PUBLICATIONS

Bai et al., "Rotman Lens-Based Circular Array for Generating Five-mode OAM Radio Beams", Scientific Reports. published Jun. 10, 2016, 8 pages.
Cai et al., "Dipole Uniform Circular Array Backed By a Cylindrical Reflector", CSIRO, ICT Centre, Marsfield, NSW 2122, Australia, 2010, 5 pages.
Canadian Office Action for Canadian Application No. 3,099,910, dated Feb. 9, 2021, 8 pages.
European Communication Pursuant to Article 94(3) for European Application No. 19 803 587.5, dated Aug. 29, 2023, 6 pages.
Extended European Search Report for European Application No. 19 803 587.5, dated Mar. 18, 2022, 17 pages.
Glöcker, "Phased Array for Millimeter Wave Frequencies", International Journal of Infrared and Millimeter Waves, 1990, vol. 11, No. 2, pp. 101-110.
Huang et al., "60 GH Multibeam Antenna Array for Gigabit Wireless Communication Networks", IEEE Transactions on Antennas and Propagation, IEEE, USA, 2006, vol. 54, No. 12,.
Hui et al., "A Cylindrical DR Rod Antenna Fed by a Short Helix", 1996 Digest IEEE Antennas and Propagation Society International Symposium, Jul. 21-26, 1996.
Indian Examination Report for Indian Application No. 202017054089, dated Dec. 21, 2021, with translation, 9 pages.
International Search Report and Written Opinion for International Application No. PCT/US2019/030375, dated Jul. 18, 2019, 5 pages.
Mueller et al., "Polyrod Antennas", BSTJ 26: Oct. 1947, pp. 837-851.
Ondrej et al., "Numerical Modeling of a Spherical Array of Monopoles Using FDTD Method", IEEE Transactions on Antennas and Propagation, Aalborg University Denmark, 2006, 13 pages.
Rousstia et al., "Switched Beam Array of Dielectric Rod Antenna with RF-MEMS Switch for Millimeter-Wave Applications", Radio Science, 2015, vol. 50, No. 3, pp. 177-190.
Yuan et al, "Generation of OAM Radio Beams with Modified Uniform Circular Array Antenna", Electronics Letters, May 26, 2016, vol. 52, No. 11, pp. 896-898.
Entire patent prosecution history of U.S. Appl. No. 16/354,671, filed Mar. 15, 2019, entitled, "Dielectric Antenna Array and System."
Entire patent prosecution history of U.S. Appl. No. 16/818,504, filed Mar. 13, 2020, entitled, "Dielectric Antenna Array and System."
Entire patent prosecution history of U.S. Appl. No. 17/228,453, filed Apr. 12, 2021, entitled, "Dielectric Antenna Array and System."

* cited by examiner

DETAIL C

DIELECTRIC ANTENNA ARRAY AND SYSTEM

CROSS-REFERENCE TO RELATED APPLICATIONS

This is a Continuation application of U.S. patent application Ser. No. 17/228,453, filed Apr. 12, 2021, now allowed, the entire disclosure of which is incorporated by reference herein. U.S. patent application Ser. No. 17/228,453 is a Continuation application of U.S. patent application Ser. No. 16/818,504, filed Mar. 13, 2020, now U.S. Pat. No. 10,998,625, issued May 4, 2021, which is a continuation of U.S. patent application Ser. No. 16/354,671, filed Mar. 15, 2019, now U.S. Pat. No. 10,644,395, issued May 5, 2020, the entire disclosures of which are incorporated by reference herein.

U.S. patent application Ser. No. 16/354,671 claims priority to U.S. Provisional Patent Application No. 62/671,408, filed on May 14, 2018, titled "Dielectric Antenna Array and System"; U.S. Provisional Patent Application No. 62/693,584, filed on Jul. 3, 2018, titled "Dielectric Antenna Array and System"; and U.S. Provisional Patent Application No. 62/754,952, filed on Nov. 2, 2018, titled "Dielectric Antenna Array and System," the entire disclosures of which are incorporated by reference herein.

TECHNICAL FIELD

The present subject matter relates to an antenna with dielectric structures, for example, arrays, stacks, and other arrangements of the dielectric structures with control circuitry and techniques for achieving beam directionality through a switching function.

BACKGROUND

Radio antennas are critical components of all radio equipment, and are used in radio broadcasting, broadcast television, two-way radio, communication receivers, radar, cell phones, satellite communications and other devices. A radio antenna is an array of conductors electrically connected to a receiver or transmitter, which provides an interface between radio frequency (RF) waves propagating through space and electrical currents moving in the conductors to the transmitter or receiver. In transmission mode, the radio transmitter supplies an electric current to antenna terminals, and the antenna radiates the energy from the current as electromagnetic waves (radio waves). In reception mode, the antenna intercepts some of the power of an electromagnetic wave in order to produce an electric current at the antenna terminals, which is applied to a receiver for amplification.

One type of radio antenna is a phased array line feed antenna. The phased array lined feed antenna is typically optimized for continuous, electronic beam steering in association with or without a spherical reflector. An example suitable application for the phased array line feed antenna is space applications. For applications that require a narrow RF beam, complex driving electronics are needed to control the phased array line feed antenna. For example, phase shifters can be utilized to provide the narrow RF beam. But phase shifters tend to be lossy, which requires additional power amplifiers for both receiving and transmitting.

As a result, adapting the phased array line feed antenna for a narrow RF beam application is expensive. In applications where a narrow beam is desired, such as 5G applications, both the narrow RF beam as well as a beam steering function is desirable. Unfortunately, implementing both a narrow RF beam and a beam steering function in a cost-effective manner is difficult in radio antennas, such as the phased array line feed antenna.

SUMMARY

In an example, an antenna system includes a plurality of dielectric rod stacks and a control circuit. The control circuit includes a plurality of independently controlled output circuit boards. Each independently controlled output circuit board includes a respective dielectric rod stack. The respective dielectric rod stack includes a plurality of respective dielectric rods. The control circuit selects: (i) the dielectric rod stacks, and (ii) the respective dielectric rods of the respective dielectric rod stack to adjust a beam of emitted or received radio frequency (RF) waves.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical, physical, electrical, or optical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

The orientations of the dielectric antenna arrays, associated components and/or any complete devices incorporating a dielectric antenna array such as shown in any of the drawings, are given by way of example only, for illustration and discussion purposes. In operation for a particular RF processing application, a dielectric antenna array may be oriented in any other direction suitable to the particular application of the dielectric antenna array, for example upright, sideways, or any other orientation. Also, to the extent used herein, any directional term, such as lateral, longitudinal, up, down, upper, lower, top, bottom and side, are used by way of example only, and are not limiting as to direction or orientation of any dielectric antenna array or component of a dielectric antenna array constructed as otherwise described herein. Reference now is made in detail to the examples illustrated in the accompanying drawings and discussed below.

Figure 1:
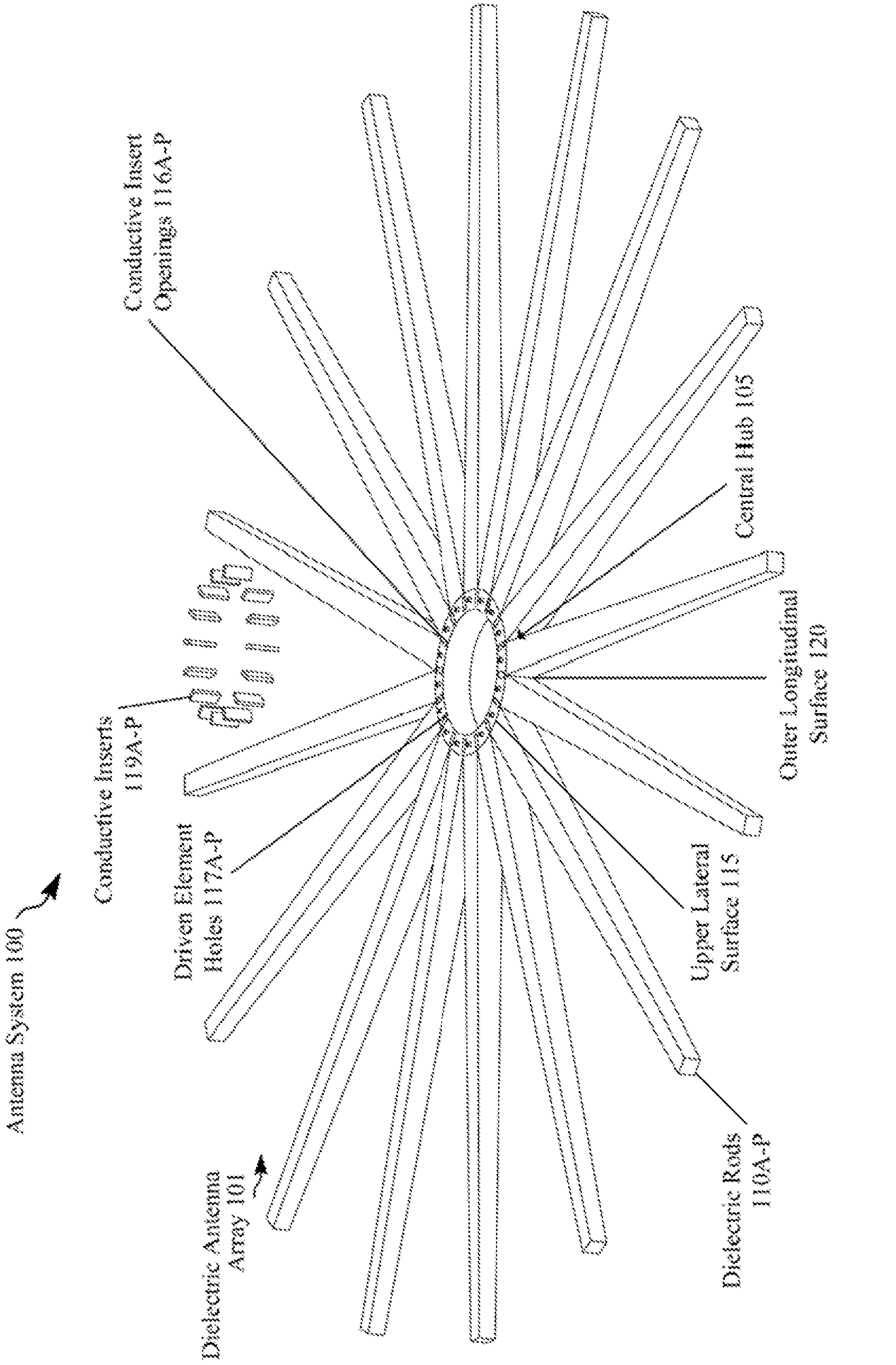
FIG. 1 is an isometric view of a dielectric antenna array of an antenna system, in which the dielectric antenna array includes a central hub, multiple dielectric rods, and conductive inserts.

FIG. 1 is an isometric view of an antenna system 100 that includes a dielectric antenna array 100. Dielectric antenna array 100 includes a central hub 105 and multiple dielectric rods 110A-P extending outwards from the central hub in a wagon wheel like arrangement. For example, the central hub 105 is a core from which each of the dielectric rods 110A-P originate (e.g., radiate) instead of a flat panel array. Central hub 105 can be formed integrally with the dielectric rods 110A-P (e.g., as one component or piece), or the central hub 105 and the dielectric rods 110A-P can be formed separately and then connected together. Dielectric rods 110A-P appear as spokes and an RF beam is confined down the long axis of each dielectric rod 110A-P and can emit or receive an independent RF beam, which is isolated, e.g., for beamforming. In the example, transmission and reception of RF waves occurs on the ends (e.g., tips) of each dielectric rod 110A-P. Thus, each dielectric rod 110A-P behaves as an end-fire antenna with about a 20 degree RF beam angle.

Figure 2:
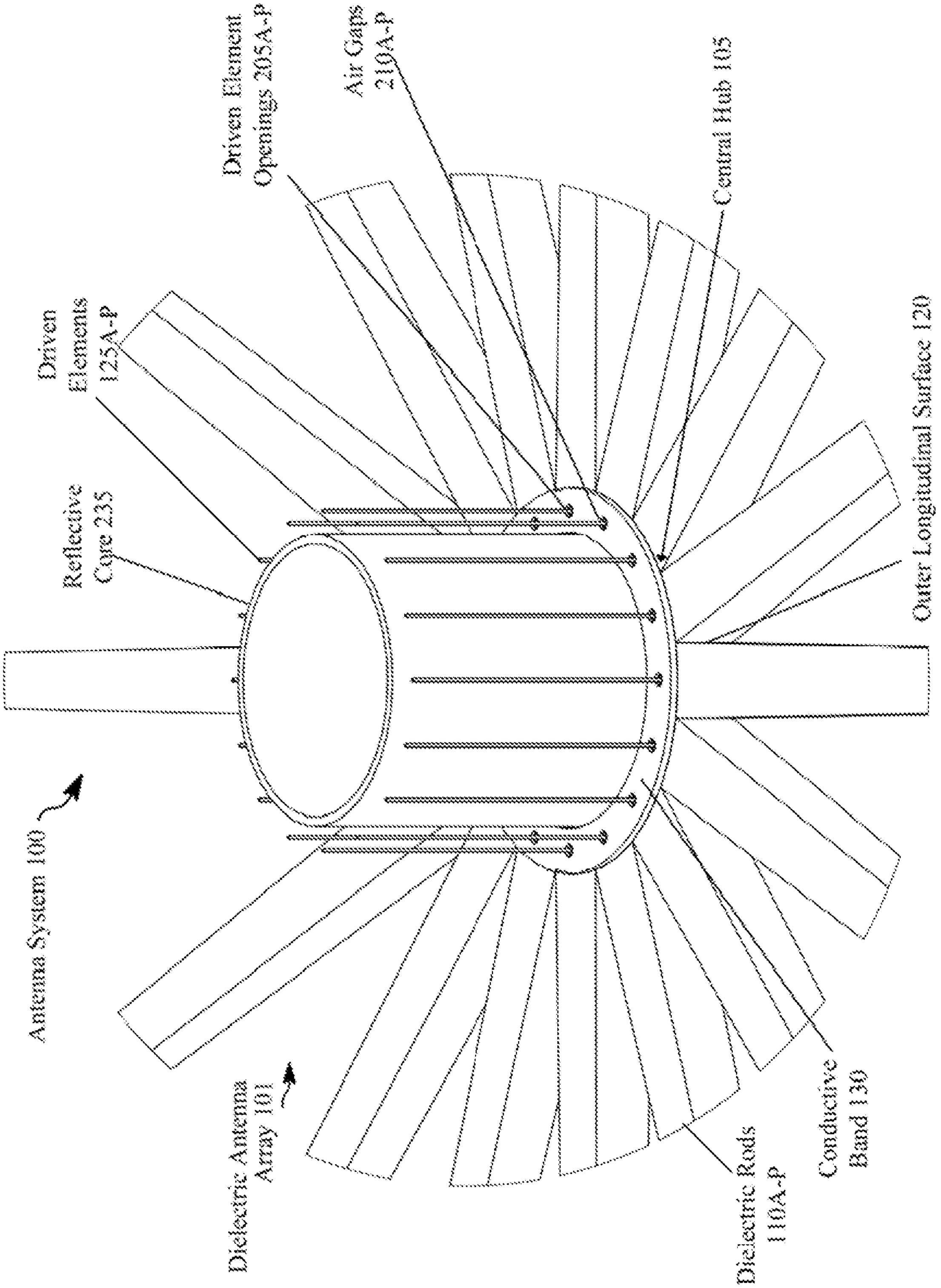
FIG. 2 is an isometric view of the dielectric antenna system, which includes the dielectric antenna array of FIG. 1 with a conductive band and multiple driven elements, and showing additional details of the coupling of the dielectric antenna array to the driven elements.

Although not visible in FIG. 1, as shown in FIG. 2, the antenna system 100 includes a plurality of driven elements 125A-P and each driven element 125A-P extends transversely through the central hub 105. In the example, there are sixteen dielectric rods 110A-P and sixteen corresponding driven elements 125A-P to independently control a respective dielectric rod 110A-P. The geometry of each dielectric rod 110A-P, which can affect the number of dielectric rods 110A-P that fit around the central hub 105, and corresponding driven elements 125A-P may vary depending on how narrow an RF beam is desired. For dielectric rods 110A-P with a square cross-section (see element 710 of FIG. 7), the length, width, and thickness of dielectric rods 110A-P adjusts the RF beam size. For dielectric rods 110A-P with a circular cross-section, the circumference, radius, etc. adjusts the RF beam size. In the example, the RF beam is fixed at about 20°, as a result of the geometry of the dielectric rods 110A-P with the depicted square shaped cross-section (see element 710 of FIG. 7). Typically, the number of dielectric rods 110A-P matches the number of driven elements 125A-P. But in some examples, there may be fewer driven elements 125A-P than dielectric rods 110A-P, for example, a single driven element 125A may drive two, three or more of dielectric rods 110A-P. As will be further described with reference to FIG. 8 below, antenna system 100 also includes a control circuit (see element 800 of FIG. 8) coupled to the dielectric antenna array 100 to switch the driven elements 125A-P to drive one or more of the dielectric rods 110A-P to transmit or receive radio frequency (RF) waves.

Each of the dielectric rods 110A-P and the central hub 105 are formed of polystyrene, polyethylene, Teflon®, another polymer, or a dielectric ceramic. Ceramics are inorganic, non-metallic materials that have been processed at high temperatures to attain desirable engineered properties. Some elements, such as carbon or silicon, may be used to form ceramic materials. Suitable ceramics that may form the dielectric rods 110A-P can be alumina (or aluminum oxide $Al_2O_3$), aluminum nitride (AlN), zirconia toughened alumina, beryllium oxide (BeO), and other suitable ceramic material compositions. Dielectric ceramics are used in microwave communications. Inside, the dielectric rods 110A-P are typically solid dielectric material and do not have any conductive material. However, in some examples, dielectric rods 110A-P may include hollow cavities filled with conductive material to reflect and concentrate RF waves in different portions of the dielectric rods 110A-P.

In the example, the dielectric rods 110A-P are arms formed of dielectric material that are radially arranged around the central hub 105. However, dielectric rods 110A-P may not be arranged in a radial arrangement around a cylindrical central hub 105 as depicted in FIG. 1. For example, dielectric rods 110A-P can be arranged such that dielectric rods 110A-P extend from different surfaces of the central hub 105. In one example, the dielectric rods 110A-P are in a pincushion or porcupine arrangement, extending from an upper conical surface of a partial spheroid shaped central hub 105, like that shown in FIG. 9. Conical surfaces include a paraboloid, hyperboloid, ellipsoid, oblate ellipsoid, spheroid, etc., or a portion, fraction, or combination thereof. Conical surfaces are formed by intersecting a cone with a plane to derive a conic section and then rotating the conic section in three-dimensional space to form aspherical or spherical portions. In another example, the central hub 110 may have a polyhedron shape (e.g., cuboid) and the dielectric rods 110A-P extend from a planar upper lateral surface or planar longitudinal surfaces, for example, near corners of the cuboid shaped central hub 105. Each of the dielectric rods 110A-P have a cross-section that is square shaped and the cross-section is tapered as the dielectric rod extends further away from the central hub 105. Although the cross-section of the dielectric rods 110A-P is shown as square shaped, the cross-section can be shaped as a circle; oval; polygon, such as a triangle, rectangle, pentagon, hexagon, octagon, triangle; or a portion, fraction, or combination thereof (e.g., semi-circle).

Central hub 105 includes an upper lateral surface 115, a lower lateral surface (see element 630 in FIG. 6C), and an outer longitudinal surface 120 extending between the upper lateral surface 115 and the lower lateral surface 630. As shown in FIGS. 6C-D, the outer longitudinal surface 120 is the dielectric portion of the central hub 105 that is located outside of where the driven elements 125A-P extend transversely through the central hub 105 (e.g., exterior or outwards facing).

As shown in FIGS. 6C-D, an inner longitudinal surface 625 is the dielectric portion of the central hub 105 that is located inside of where the driven elements 125A-P extend transversely through the central hub 105 and is lined by the reflective core 235 (e.g., interior or inwards facing). As shown in FIG. 6C, the upper lateral surface 115 is the dielectric portion of the central hub 105 that is located above dielectric rods 110A-B (e.g., top of central hub 105). As shown in FIG. 6C, the lower lateral surface 630 is the dielectric portion of the central hub 105 that is located below dielectric rods 110A-B (e.g., bottom of central hub 105). Dielectric rods 110A-P extend laterally outwards from the outer longitudinal surface 120. Dielectric rods 110A-P are flatly sloped relative to an area of origin where the dielectric rods 100A-P originally extend outwards (e.g., base) from the outer longitudinal surface 120 to their tips. However, in some examples the dielectric rods 110A-P are sloped upwards or downwards relative to the area of origin.

In FIG. 1, the conductive band 130 of FIG. 2 is removed. As shown in FIG. 1, the upper lateral surface 115 and the lower lateral surface (see element 630 of FIG. 6C) can both include driven element holes 117A-P formed for each driven element 125A-P to extend transversely through the central hub 105. As shown, the central hub 105 includes a plurality of conductive insert openings 116A-P on the upper lateral surface 115, which may penetrate through the central hub 105 and other layers, such as lower conductive plate 310. In some examples, the lower lateral surface (see element 630 of FIG. 6C) may include the conductive insert openings 116A-P, which are cuboid shaped holes or spaces in the example, but various hole shapes can be utilized, including ellipsoid, cone, cuboid, other polyhedron, or a portion, fraction, or combination thereof. Each conductive insert opening 116A-P is formed in between where each of the dielectric rods 110A-P extends from the central hub 105. Dielectric antenna array 101 further includes a plurality of conductive inserts 119A-P with a shape or profile that matches the hole shape of the conductive insert openings 116A-P. Conductive inserts 119A-P are positioned inside the conductive insert openings 116A-P to avoid crosstalk between the dielectric rods 110A-P and direct the electromagnetic RF waves in a respective dielectric rod 110A-P. In the example, conductive inserts 119A-P are metal barrier dividers between each of the spokes to direct the RF energy in each of dielectric rods 119A-P via reflection so the RF waves do not bleed over to a different dielectric rods 119A-P.

Once inside the conductive insert openings 116A-P, the conductive inserts 119A-P may be bonded to the central hub 105 with epoxy, for example. The epoxy can be cured using ultraviolet (UV) light. Although sixteen conductive insert openings 116A-P and sixteen conductive inserts 119A-P are shown, the number of conductive insert openings 116A-P and conductive inserts 119A-P varies depending on how narrow an RF beam is desired, and typically matches the number of dielectric rods 110A-P. There may be fewer conductive insert openings 116A-P and conductive inserts 119A-P than dielectric rods 110A-P. For example, if a single driven element 125A drives two, three or more of dielectric rods 110A-P, the number of conductive insert openings 116A-P and conductive inserts 119A-P actually matches the number of driven elements 125A-P.

Figure 10:
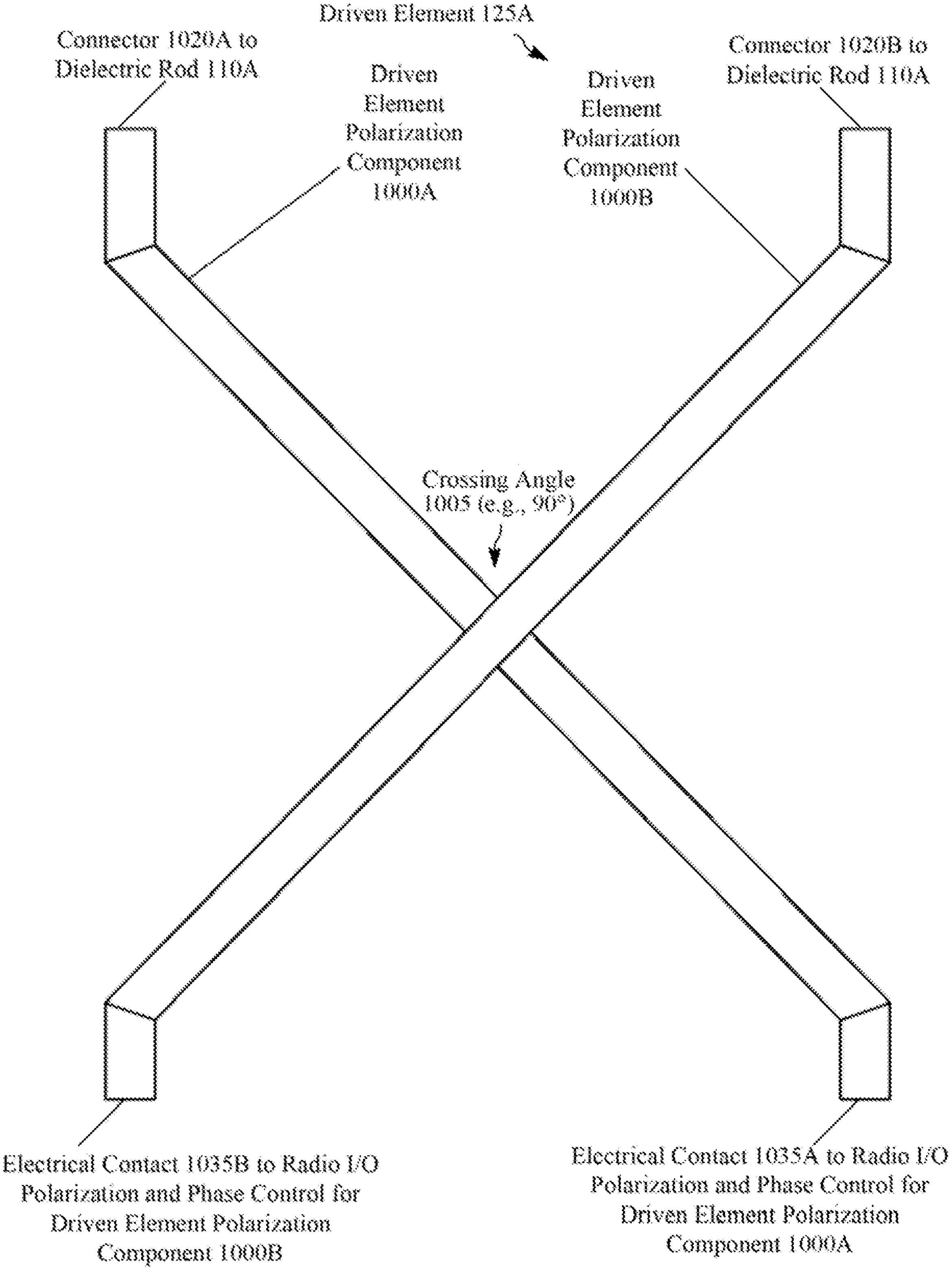
FIG. 10 shows a driven element, which includes crossed monopoles, for polarization control of RF signals, including linear (e.g., horizontal or vertical) or circular polarization.

FIG. 2 is an isometric view of the dielectric antenna system 100, which includes the dielectric antenna array 101 with a conductive band 130 and multiple driven elements 125A-P. In the example, each of the driven elements 125A-P are monopole driven elements. In some examples, the driven elements 125A-P may be crossed monopoles, helices, or dipoles to convey linearly polarized (e.g., horizontal or vertical in one plane) or circularly polarized RF signals. For example, each of the driven elements 125A-P may be crossed monopoles, which are crisscrossed at an angle of about 90°, as shown in FIG. 10, to control polarization of a corresponding one of the dielectric rods 110A-P. Dielectric antenna array 101 includes at least one conductive band 130 on the upper lateral surface 115 and/or the lower lateral surface (see element 630 of FIG. 6C) of the central hub 105.

As seen in FIG. 2, the upper lateral surface 115 includes a conductive band 130. Conductive band 130 directs and confines the electromagnetic RF waves inside and through the dielectric rods 110A-P in order to minimize crosstalk between dielectric rods 110A-P. The conductive band 130 can cover the conductive inserts 119A-P positioned inside the conductive insert openings 116A-P and may be electrically connected to the conductive inserts 119A-P. In some examples, the conductive band 130 is not electrically connected to the conductive inserts 119A-P.

Conductive band 130 includes driven element openings 205A-P formed for each driven element 125A-P to extend transversely through the conductive band 130. Hence, the driven elements 125A-P extend transversely through the driven element holes 117A-P of the upper lateral surface 115 and the lower lateral surface (see element 630 of FIG. 6C) and the driven element openings 205A-P of the conductive band 130. Although there are sixteen driven element openings 205A-P in the example of FIG. 2, the number of driven element openings 205A-P varies depending on how narrow an RF beam is desired, and typically matches the number of dielectric rods 110A-P. There may be fewer driven element openings 205A-P than dielectric rods 110A-P. For example, if a single driven element 125A drives two, three or more of dielectric rods 110A-P, the number of driven element openings 205A-P actually matches the number of driven elements 125A-P.

Although the conductive band 130 is shaped as a ring, the conductive band 130 can be formed as a conductive trace shaped as a circle; oval; polygon, such as a triangle, rectangle, pentagon, hexagon, octagon, triangle; or a portion, fraction, or combination thereof (e.g., semi-circle). Driven elements 125A-P are annularly arranged around the conductive band 130 in the example. The arrangement driven elements 125A-P around the conductive band 130 varies depending on the shape of the conductive band 130 (e.g., oval, polygon, etc.).

Also shown in FIG. 2 are additional details of the coupling of the dielectric antenna array 101 to the driven elements 125A-P. Conductive band 130 and the driven elements 125A-P are not electrically connected in the example. Instead, the conductive band 130 and the driven elements 125A-P are insulated from each other. For example, the conductive band 130 is insulated from the driven elements 125A-P by a respective air gap 210A-P formed by each respective driven element opening 205A-P in between the conductive band 130 and each driven element 125A-P. Alternatively, the conductive band 130 is insulated from the driven elements 125A-P by a dielectric material filling the driven element openings 205A-P.

Although not shown in FIG. 2, the lower lateral surface (see element 630 of FIG. 6C) also includes another conductive band (see element 130B of FIG. 6C), which is very similar to the conductive band 130 on the upper lateral surface 115. For example, the other conductive band (see element 130B of FIG. 6C) on the lower lateral surface (see element 630 of FIG. 6C) includes driven element openings 205A-P. The other conductive band (see element 130B of FIG. 6C) is insulated from the driven elements 125A-P by air gaps 210A-P or dielectric material filling the driven element openings 205A-P. Conductive band 130 on the upper lateral surface 115, the other conductive band on the lower lateral surface (see element 630 of FIG. 6C) together with the reflective core 235 and conductive inserts 119A-P form a short waveguide, which concentrates electromagnetic energy (e.g., RF waves) towards the dielectric rods 110A-P. When one or more of the driven elements 125A-P is radiating RF waves, these components confine and direct (e.g., push) the RF waves towards or inside the dielectric rods 110A-P.

As further shown, the dielectric antenna array 101 includes a reflective core 235 extending longitudinally between the upper lateral surface 115 and the lower lateral surface (see element 630 of FIG. 6C) of the central hub 105. Hence, inside the central hub 105 is hollow and the reflective core 235 lines the circumference to and reflects the RF energy. In one example, reflective core 235 can be a quarter wavelength behind the dielectric rods 110A-P. Together, the reflective core 235 and conductive inserts 119A-P can reflect the RF energy inside the dielectric rods 110A-P.

Reflective core 235 can be a metal piping that lines an inner longitudinal surface (see element 625 of FIG. 6D) of the central hub 105 to cover the inside of the central hub 105 and direct the RF waves through the dielectric rods 110A-P. Reflective core 235 is electrically connected to the at least one conductive band 130 on the upper lateral surface 115 and/or the lower lateral surface (see element 630 of FIG. 6C) of the central hub 105. However, in some examples the reflective core 235 may not be electrically connected to the at least one conductive band 130 on the upper lateral surface 115 or the lower lateral surface (see element 630 of FIG. 6C) of the central hub 105.

The various dielectric antenna array 101 constructs disclosed herein can be manufactured using a variety of techniques, including casting, layering, injection molding, machining, plating, milling, depositing one or more conductive coatings, or a combination thereof. For example, the central hub 105 and dielectric rods 110A-P can be formed using casting or injection molding to form a single integral piece. Alternatively, in some examples, the central hub 105 and dielectric rods 110A-P can be casted and molded separately and then mechanically fastened together. Secondary machining operations, including laser ablation, can be used, for example, to create the shape of the central hub 105 and dielectric rods 110A-P, by burning away or otherwise removing undesired portions, for example, to taper the dielectric rods 110A-P or form conductive insert openings 116A-P, driven element holes 117A-P, or protrusions (see elements 315A-E of FIG. 3C). Conductive layers or films can be deposited as the at least one conductive band 130 or conductive plates can be utilized, for example, by plating that plane before stacking more layers on top of it. Conductive inserts 119A-P, driven elements 125A-P, at least one conductive band 130, and reflective core 235 may be formed of any suitable conductor or metallization layer, such as copper, aluminum, silver, etc., or a combination thereof. The same or different conductive materials may be used to form the conductive inserts 119A-P, driven elements 125A-P, at least one conductive band 130, and reflective core 235. Secondary machining operations can also be utilized to shape the conductive inserts 119A-P, driven elements 125A-P, at least one conductive band 130, or the reflective core 235 by removing undesired portions, for example, to form driven element holes 117A-P, driven element openings 205A-P, etc. In one example, two conductive bands 130A-B (see FIGS. 6C-D) are formed above and below the dielectric rods 110A-P of the dielectric antenna array 101. If there are multiple layers, like the stacked dielectric antenna arrays 101A-E shown in FIG. 5, one of the conductive bands 130A-B is shared like that shown in FIGS. 6C-D, in a manner somewhat like spacers in between the layers of stacked dielectric antenna arrays 101A-E.

Figure 3A:
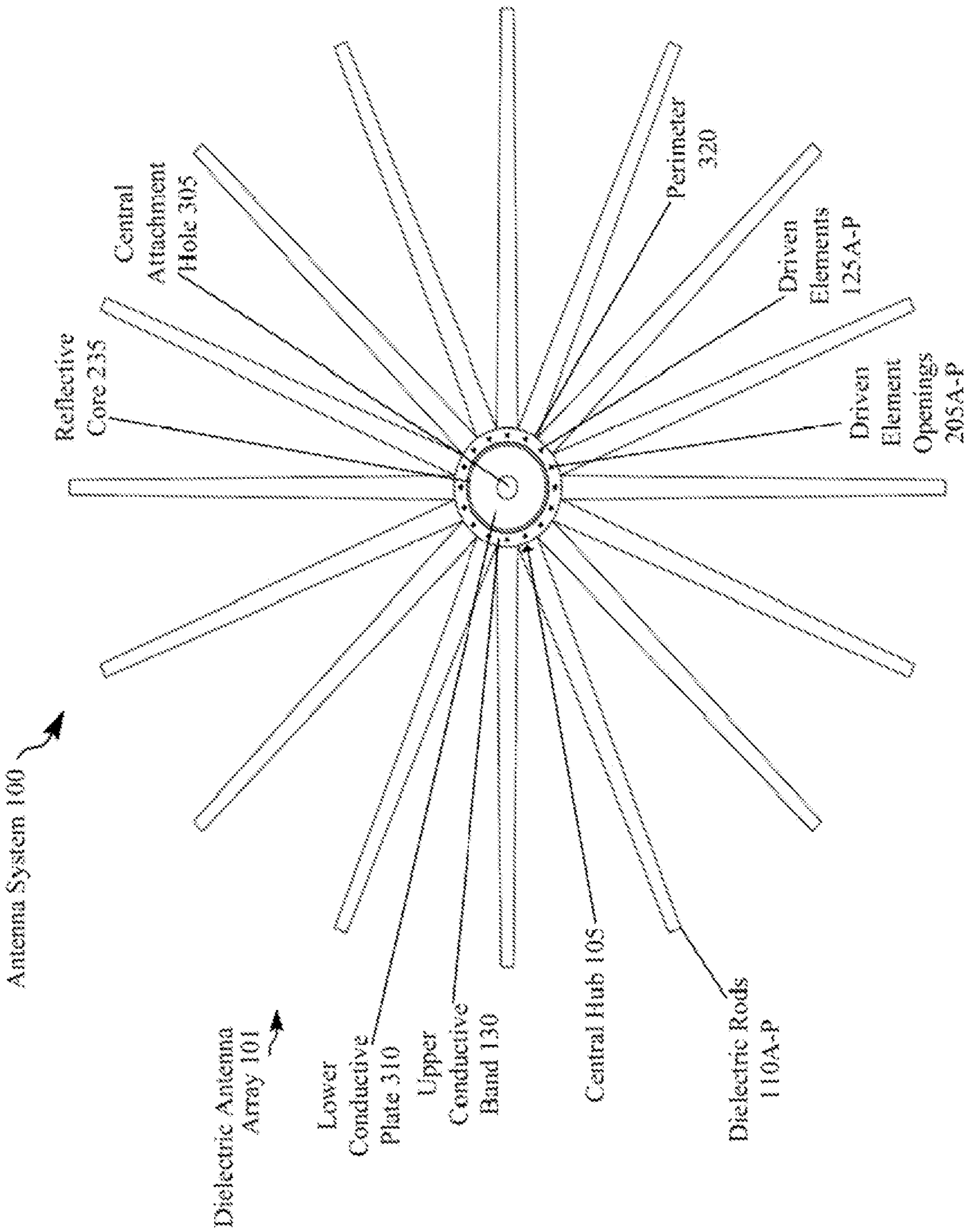
FIG. 3A is a top view of the dielectric antenna array of FIG. 1, illustrating a layout in which the dielectric rods are radially arranged around the central hub.

FIG. 3A is a top view of the dielectric antenna array 101 illustrating a layout in which the dielectric rods 110A-P are radially arranged around the central hub 105. Conductive plate 130 is removed. As shown, the upper lateral surface 115 of the central hub 105 defines a perimeter 320 of the central hub 105. The perimeter 320 is shaped as a circle in the example. However, in some examples, the perimeter 320 can be shaped as an oval, polygon, or a portion, fraction, or combination thereof, depending on the shape of the upper lateral surface 115. Driven elements 125A-P are radially arranged around the perimeter 320 and extend transversely through the central hub 105 via driven element holes 117A-P. The arrangement of driven elements 125A-P around the perimeter 320 varies depending on the shape of the perimeter 320 (e.g., oval, polygon, etc.).

In FIG. 3A, a cap and a screw for mechanical fastening are removed, hence a central attachment hole 305 and a lower conductive plate 310 (e.g., a metal disk) shown. The central attachment hole 305 can be utilized for mechanically fastening the dielectric antenna array 101 to other components, such as the control circuit (see element 800 of FIG. 8) or other dielectric antenna arrays 101A-E in a dielectric antenna matrix 500 arrangement like that shown in FIG. 5. Also shown, is the reflective core 235 lining the inside of the central hub 105. Inside the reflective core 235 is an air-filled cavity (see element 650 of FIG. 6B) that is partially closed off on the lower lateral surface (see element 630 of FIG. 6C) side of the central hub 105 by the lower conductive plate 305.

Figure 3B:
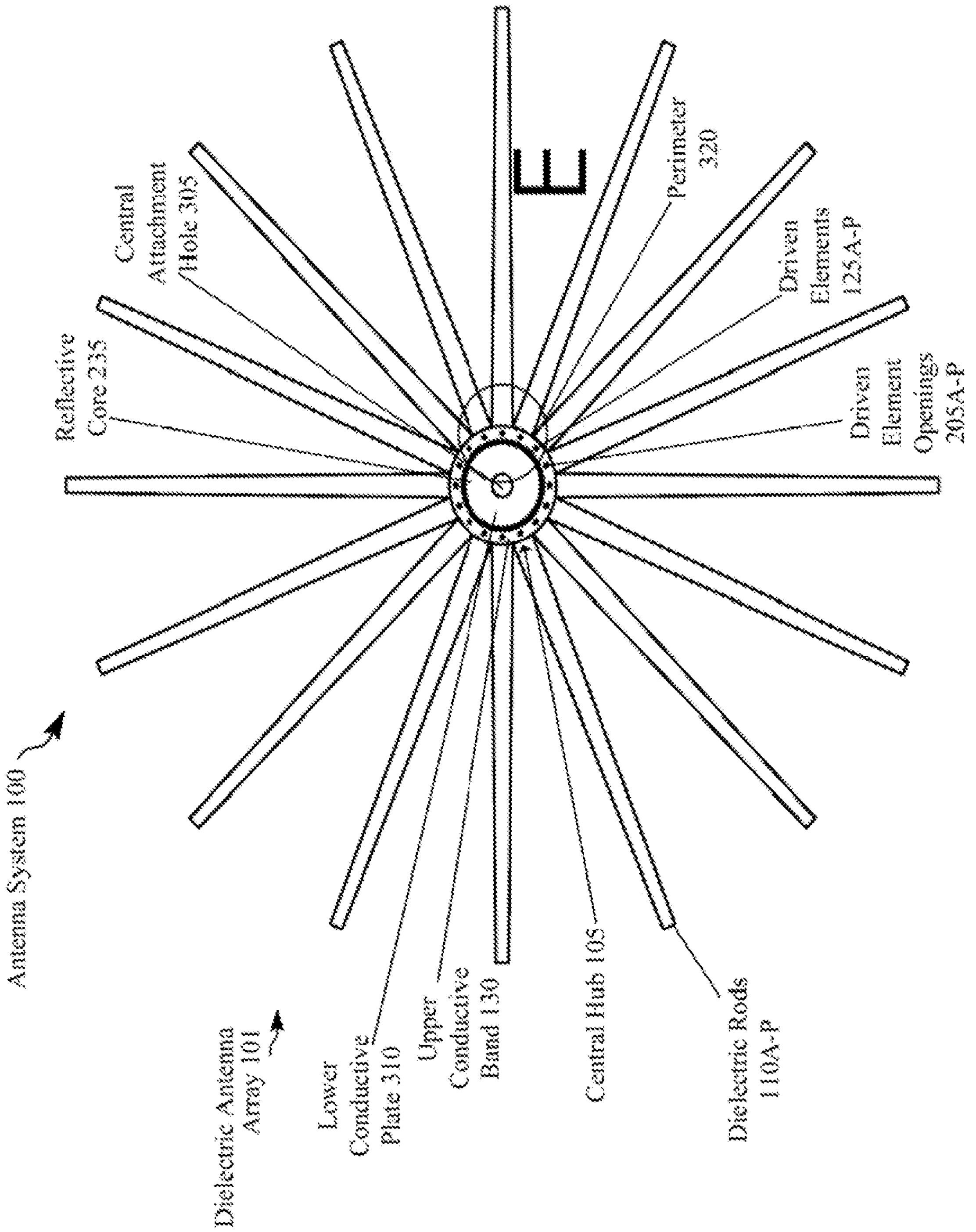
FIG. 3B is another top view of the dielectric antenna array of FIG. 1 like that of FIG. 3A, with an encircled detail area to show context for the zoomed in view of FIG. 3C.
Figure 3C:
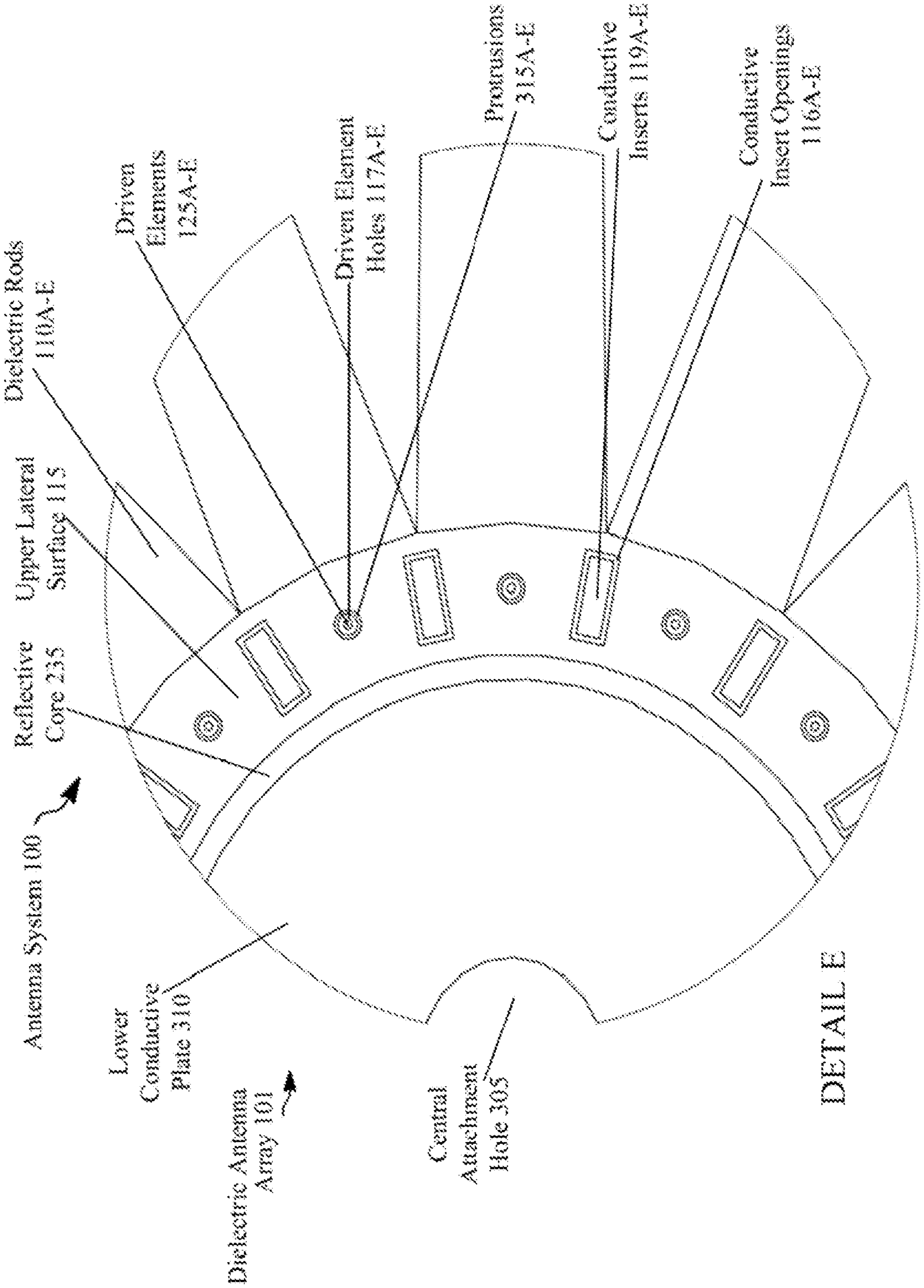
FIG. 3C is the zoomed in view of the encircled detail area of the dielectric antenna array of FIG. 3B and shows various conductive insert openings and driven element holes of the central hub of the dielectric antenna array of FIG. 1.

FIG. 3B is another top view of the dielectric antenna array 101 like that of FIG. 3A, with an encircled detail area E to show context for the zoomed in view of FIG. 3C. FIG. 3C is the zoomed in view of the encircled detail area E of the dielectric antenna array 101 of FIG. 3B and shows various conductive insert openings 116A-P and driven element holes 117A-P of the central hub 105 of the dielectric antenna array 101. Moving left to right in the detail area E is the central attachment hole 305, which is an opening formed in the lower conductive plate 310. Lower conductive plate 310 is a type of conductive band 130 formed on the lower lateral surface (element 430 of FIG. 4) to enclose the lower lateral surface side of the central hub 105. Lower conductive plate 310 is shown in further detail as element 130B of FIG. 6C. Lower conductive plate 310 redirects the electromagnetic RF waves through the dielectric rods 110A-P in a manner similar to the at least one conductive band 130 to confine and direct (e.g., push) the RF waves towards or inside the dielectric rods 110A-P. For mechanical fastening purposes, lower conductive plate 310 is much larger than the conductive band 130 on the upper lateral surface 115. Lower conductive plate 310 thus has a larger surface area than the upper lateral surface 115 and the lower lateral surface (see element 630 of FIG. 6C). For example, lower conductive plate 310 is utilized for connection to the control circuit (see element 800 of FIG. 8) of the antenna system 100, such as for mechanical fastening to a board of the control circuit (see element 800 of FIG. 8). Thus, lower conductive plate 310 provides mechanical support for the dielectric antenna array 101. In another configuration, the conductive plate 310 is formed similar to the at least one conductive band 130, but is connected to another part of a similar or different material (e.g., mechanical support legs) that actually provides the mechanical support structure for dielectric antenna array 101.

As further shown in FIG. 3C, the reflective core 235 is adjacent the upper lateral surface 115 and typically lines an inner longitudinal surface (see element 625 of FIG. 6D) of the central hub 105. Next is the upper lateral surface 115, which is shown as including five whole conductive insert openings 116A-E. Conductive insert openings 116A-E are filled with five conductive inserts 119A-E. Upper lateral surface 115 also includes five driven element holes 117A-E and five driven elements 125A-E transversely extend through a respective driven element hole 117A-E. Also formed around each of the driven element holes 117A-E is a respective protrusion 315A-E. The protrusions 315A-E are formed of dielectric material like the central hub 105 and dielectric rods 110A-P. Protrusions 315A-E engage the conductive band 130 with the upper lateral surface 115 of the central hub 105. Protrusions 315A-E insulate driven elements 125A-E from the conductive band 130. Although only five protrusions 315A-E are shown, the number of protrusions 315A-E varies depending on how narrow an RF beam is desired. In the example, the number of protrusions 315A-E matches the number of dielectric rods 110A-P, thus there are actually sixteen protrusions 315A-P even though only five are shown in the zoomed in view of FIG. 3C.

Figure 4:
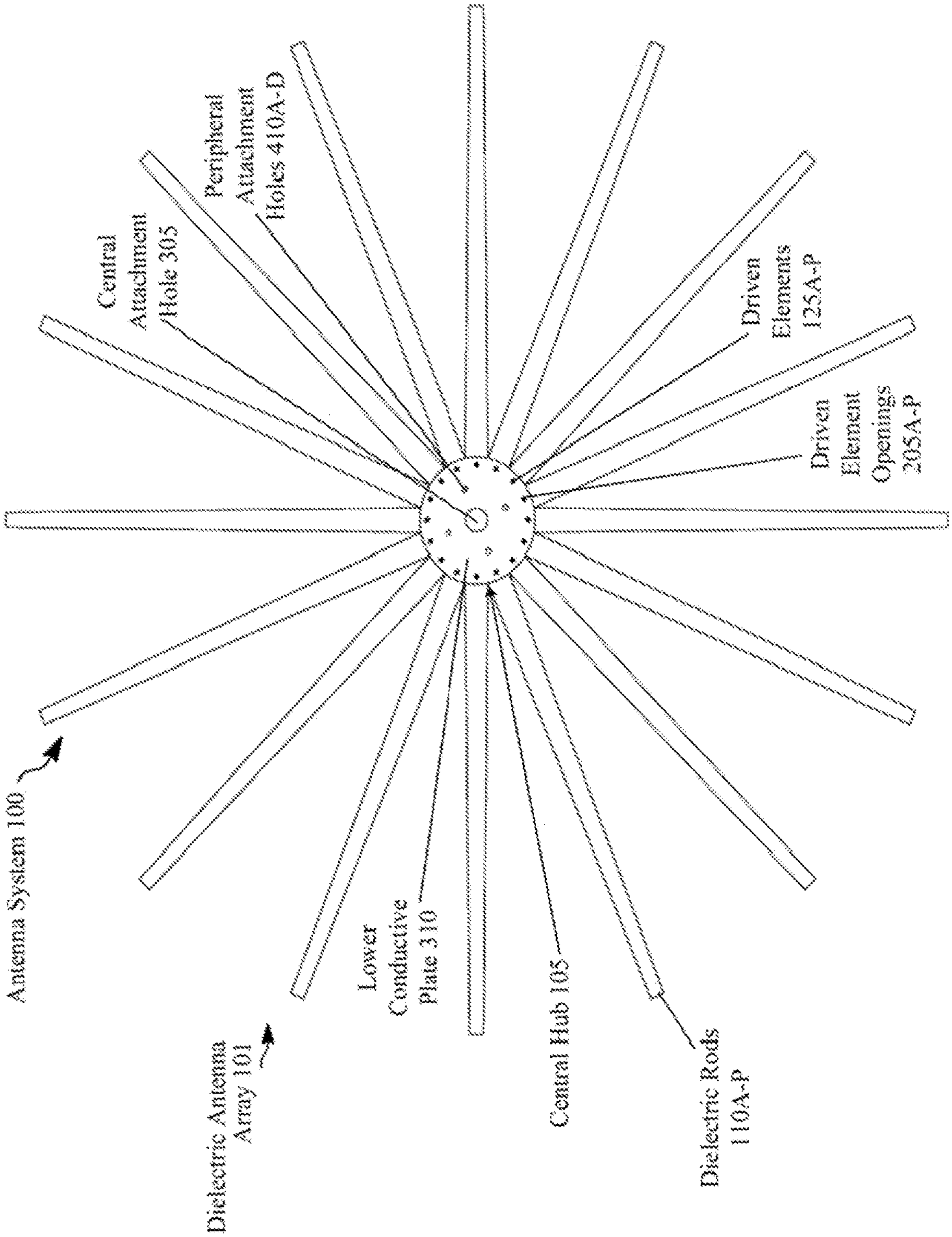
FIG. 4 is a bottom view of the dielectric antenna array of FIG. 1, illustrating the layout in which the dielectric rods are radially arranged around the central hub.

FIG. 4 is a bottom view of the dielectric antenna array 101, illustrating the layout in which the dielectric rods 110A-P are radially arranged around the central hub 105 like FIG. 3A. Central hub 105 includes the lower lateral surface 430, which is covered by the lower conductive plate 310 in the example. The central attachment hole 305 formed in the lower conductive plate 310. Four peripheral attachment holes 410A-D are also depicted as being formed in the lower conductive plate 310 for screws or other mechanical fasteners. Central attachment hole 305 and peripheral attachment holes 410A-B are utilized for mechanically fastening the dielectric antenna array 101 to other components, such as the control circuit (see element 800 of FIG. 8) or other dielectric antenna arrays 101A-E in a dielectric antenna matrix 500 arrangement like that shown in FIG. 5. As further shown, the lower lateral surface 430 includes driven element holes 117A-P formed for each driven element 125A-P to extend transversely through the lower lateral surface 430.

Figure 5:
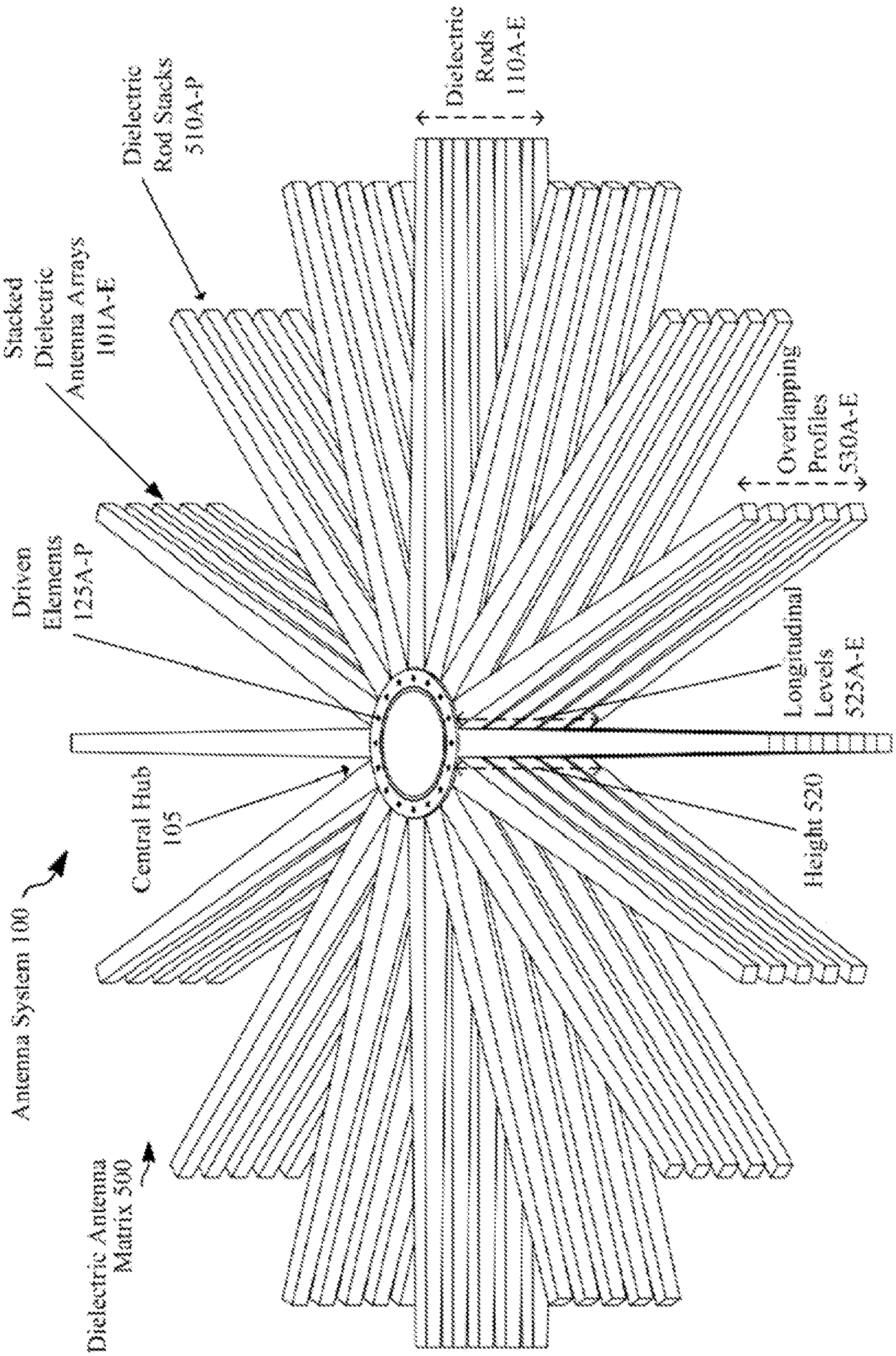
FIG. 5 is an isometric view of a dielectric antenna matrix that includes multiple stacked dielectric antenna arrays of FIG. 1 to form dielectric rod stacks, where each dielectric rod stack is driven by a respective driven element.

FIG. 5 is an isometric view of a dielectric antenna matrix 500 of the dielectric antenna system 100. Dielectric antenna matrix 500 includes multiple stacked dielectric antenna arrays 101A-E to form multiple dielectric rod stacks 510A-P. In the example of FIG. 5, five stacked dielectric antenna arrays 101A-E are shown, but in other examples, there may be fewer (e.g., two or three) or more (e.g., ten of fifteen) stacked dielectric antenna arrays. Also in the example of FIG. 5, sixteen dielectric rods stacks 510A-P are shown with five dielectric rods in each of the dielectric rod stacks 510A-P. In some examples, each of the dielectric rod stacks 510A-P may include fewer (e.g., two or three) or more (e.g., ten of fifteen) dielectric rods. Moreover, the number of dielectric rods stacks 510A-P may be fewer (e.g., five or ten) or greater (e.g., twenty or thirty).

Each dielectric rod stack 510A-P includes a respective dielectric rod from each of the stacked dielectric antenna arrays 101A-E and can collectively emit or receive an independent RF beam, which is isolated, e.g., for beamforming. Each dielectric rod stack 510A-P is driven by a respective one of the driven elements 125A-P. Each dielectric rod stack 510A-P is independently controllable as a separate channel by the control circuit (see element 800 of FIG. 8) through the respective driven element 125A-P to transmit or receive the RF waves as an independent RF output beam.

As shown in FIG. 5, the dielectric rods of the stacked dielectric antenna arrays 101A-E are aligned to have substantially overlapping profiles 530A-E along a height 520 of the dielectric antenna matrix 500. As used herein, "substantially overlap" means each of the dielectric rods 110A-P of the stacked dielectric antenna arrays 101A-E have dielectric structures which overlap along the height 520 (e.g., vertically) by 90% or more. The respective dielectric rod from each of the stacked dielectric antenna arrays 101A-E forming each dielectric rod stack 510A-P is positioned at a varying longitudinal level 525A-E along the height 520 of the dielectric antenna matrix 500. Each respective dielectric rod in the dielectric rod stack 510A-P is a half a wavelength apart, center plane to center plane, in the example.

In the example, dielectric antenna matrix 500 is implemented by injection molding each of the stacked dielectric antenna arrays 101A-E with sixteen radially arranged dielectric rods 110A-E each and then stacking the dielectric antenna arrays 101A-E in the vertical direction. The stacked dielectric antenna arrays 101A-E have a central hub 105 with the dielectric rods 110A-P emanating from the central hub 105 in a hub and spoke like arrangement. Stacking in the vertical direction of the dielectric antenna matrix 500 provides beam forming to narrow the RF beam down and improve RF power. Dielectric antenna matrix 500 can be implemented by injection molding each of the stacked dielectric antenna arrays 101A-E with sixteen dielectric rods 110A-E each and then stacking the dielectric antenna arrays 101A-E in the vertical direction.

Dielectric antenna matrix 500 operates like a lighthouse that can be spun around over 360 degrees and have multiple RF beams that can move around, and which can be switched by control circuit 800. Each of the dielectric rods 110A-E in a respective dielectric rod stack 510A-P is half a wavelength apart, center plane to center plane, to effectively create dielectric cones to produce a narrow RF beam. In the example, the RF beam is about 20 degrees. However, depending on the arrangement of the dielectric rod stacks 510A-P, the narrowness and breadth of the RF beam can be tailored. For example, doubling the number of dielectric rods 110A-E in a dielectric rod stack 510A-P may narrow the RF beam by a few degrees. Moreover, the RF beam can be adjusted to broader beam by making the length of the dielectric rods 110A-E shorter. In an urban environment, shorter dielectric cones may be desired to catch a wider RF beam next to roads where RF signal strength is not a major issue. However, in the countryside, a narrow RF beam may provide enhanced RF power.

In some of the examples disclosed herein, dielectric antenna array 101 or dielectric antenna matrix 500 utilizes phased, three-dimensional dielectric structures excited by one or more conductive driven elements 125A-P (e.g., monopoles) separated by conductive bands 130A-E (e.g., metallic disks) to yield a compact antenna with high directivity and broad areal coverage that is capable of receiving/transmitting electromagnetic signals. Beamforming is achieved through a combination of providing a low resistive path via preformed dielectric structures and the stacking of said structures such that they constructively and/or destructively interfere with one another. Dielectric antenna array 101 or dielectric antenna matrix 500 allow the generation of high directivity beams without requiring large numbers of passive and/or active antenna elements or phase shifters, thereby greatly simplifying construction and operation of the RF antenna. Dielectric antenna array 101 or dielectric antenna matrix 500 can be optimized for the creation of multiple, overlapping, and highly directional beams without the use of a spherical reflector.

Dielectric antenna matrix 500 is capable of receiving/transmitting signals over a ~10 to 50% bandwidth centered on a free space wavelength. Dielectric antenna matrix 500 has multiple layers, spaced by and separated by conductive bands 130A-E (e.g., thin conducting disks). As illustrated, each layer has a "wagon wheel" morphology with the dielectric rods 110A-E appearing as spokes emanating radially from a central hub 105. Each dielectric rod 110A-P acts as an end-fire antenna producing a beam directed parallel to its long axis with a fullwidth at half maximum (FWHM) given by: FWHM=60°/Square Root ($L_{\lambda 0}$)

To reduce sidelobes, the cross section of the dielectric rods 110A-P (e.g., spokes) can be tapered from at its base (where dielectric rod 110A-P leaves the central hub 105 on the outer longitudinal surface 115) to at its tip. If the number of desired beams is $N_b$, $\lambda_0$ is the free space wavelength, then the radius (R) of the central hub 105 is given by:

$$R=(N_b/4\pi)^*\lambda_0$$

The overall diameter of the antenna is then D=2 (R+$L_{\lambda 0}$). Each dielectric rod 110A-P is excited by a conductive, driven element 125A-P located ≈0.25$\lambda_d$ within the dielectric central hub 105. Here the wavelength of the dielectric is given by: $\lambda_d=\lambda_0$/Square Root ($E_r$) and $E_r$ is the relative permittivity of the dielectric material from which the dielectric rod 110A-P is formed. A metallic backshort (e.g., reflective core 235) is located in the central hub 105≠0.25$\lambda_d$ behind the driven elements 125A-P. In one example, for polystyrene, $E_r$=2.6. At a frequency of 29 GHz, $\lambda_0$=10.3 millimeters (mm). A length (L) of each of the dielectric rods 110A-P is given by L=9$\lambda_0$, which is a 92.7 millimeters (mm). The radius (R) of the central hub 105 is 8.2 mm.

Figure 9:
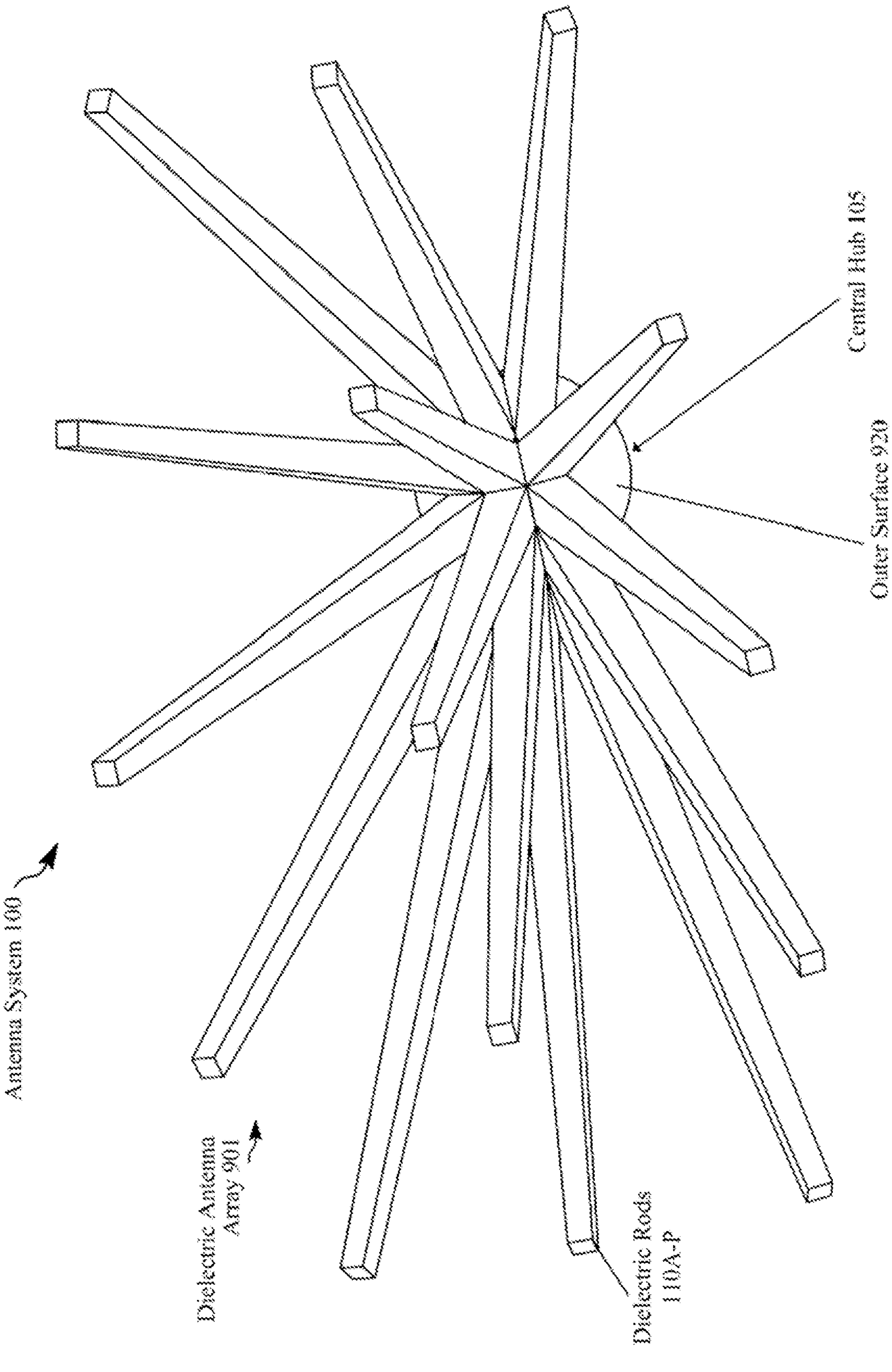
FIG. 9 is an isometric view of another dielectric antenna array of an antenna system, in which the dielectric antenna array includes a central hub and other structures like that previously described, but the multiple dielectric rods are in a pincushion or porcupine like arrangement.

By stacking multiple layers of dielectric antenna arrays 101A-E (e.g., "wagon wheel" antenna structures at spacings), the effective area of the dielectric antenna matrix 500 is increased, thereby proportionally increasing its sensitivity. The conductive driven element 125A-P at the base of each end-fired antenna 110A-P can be extended vertically throughout the stacked structure of dielectric antenna arrays 101A-E to receive and/or transmit signals. By stacking the antenna structures in this manner, the FWHM of the combined end-fire beams in the far field is further reduced in the vertical dimension by an amount ≈1/Square Root ($N_s$) where $N_s$ is the number of layers (dielectric antenna arrays) being stacked in the dielectric antenna matrix 500. As an alternative to the "wagon wheel" cylindrical configuration of dielectric antenna arrays 101A-E, the dielectric rods 110A-P can be extended from other surfaces, such as spheres or hemispheres, thereby allowing the user to customize RF beam coverage within a given environment, for example, as shown in FIG. 9.

Figure 6A:
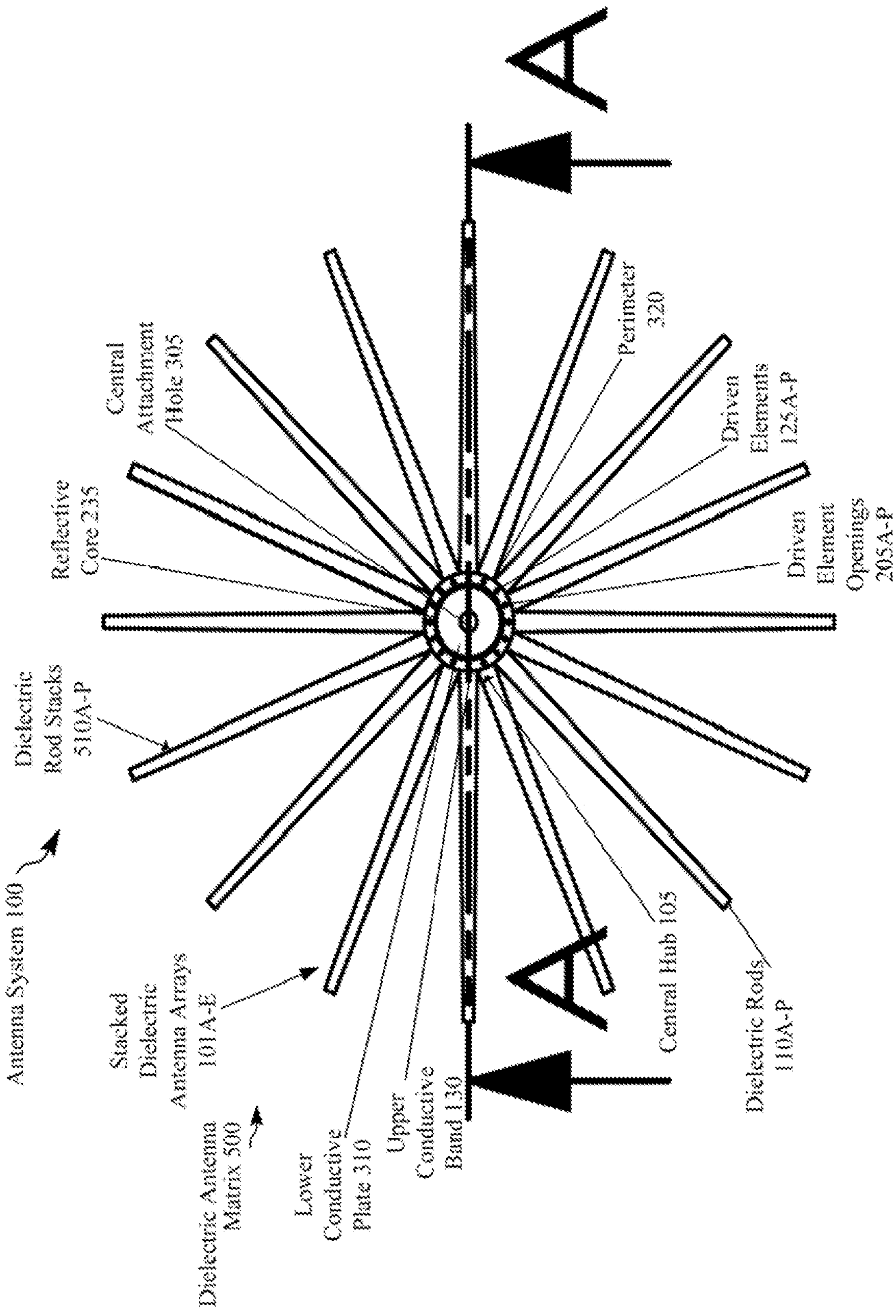
FIG. 6A is another top view of the dielectric antenna matrix of FIG. 5, with a lined through cross-section area A-A to show context for the cross-sectional view of FIG. 6B.
Figure 6B:
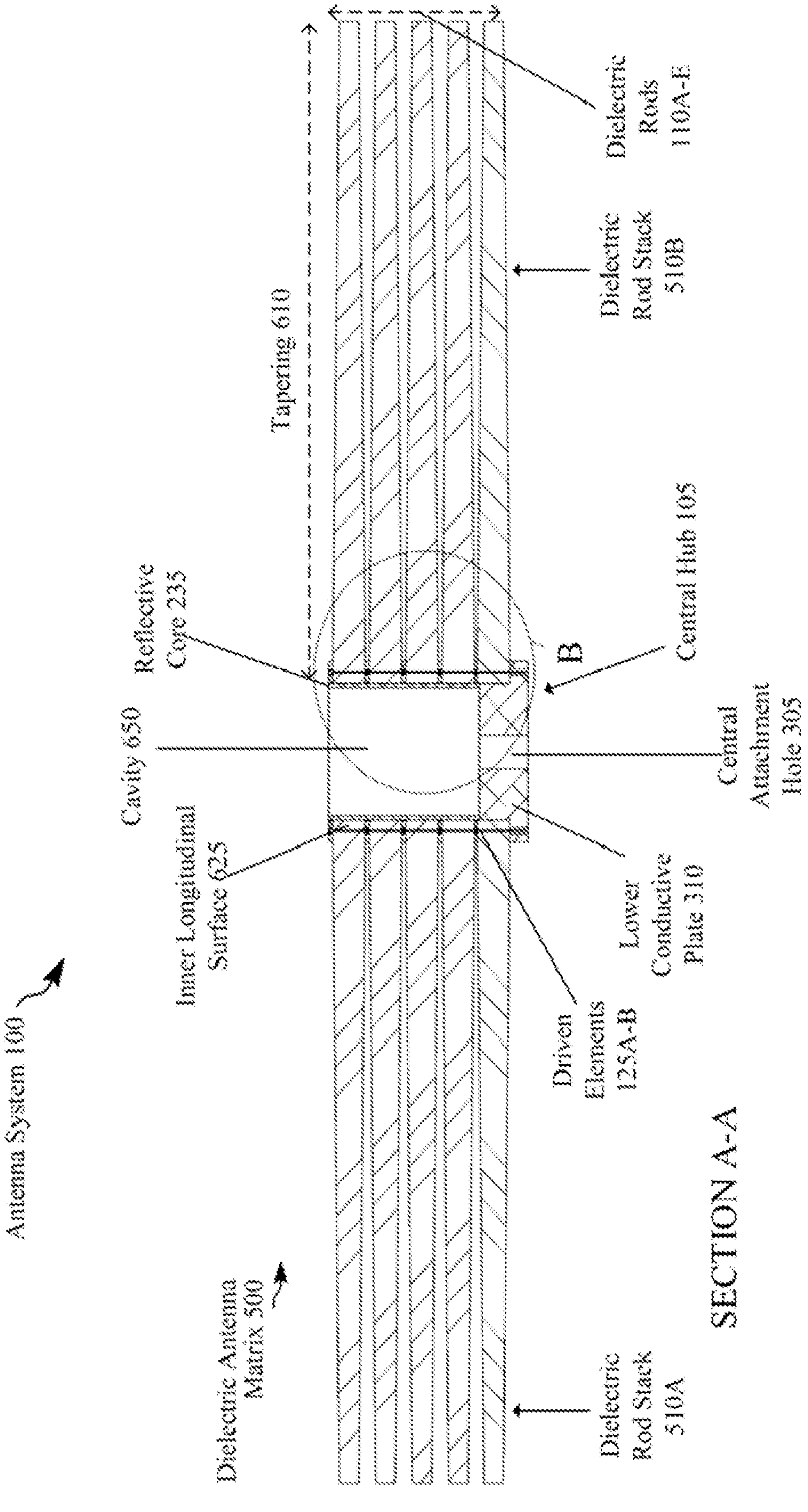
FIG. 6B is the cross-section A-A of the dielectric antenna matrix of FIG. 6A, and shows details of two dielectric rod stacks, two driven elements, and the reflective core.
Figure 6C:
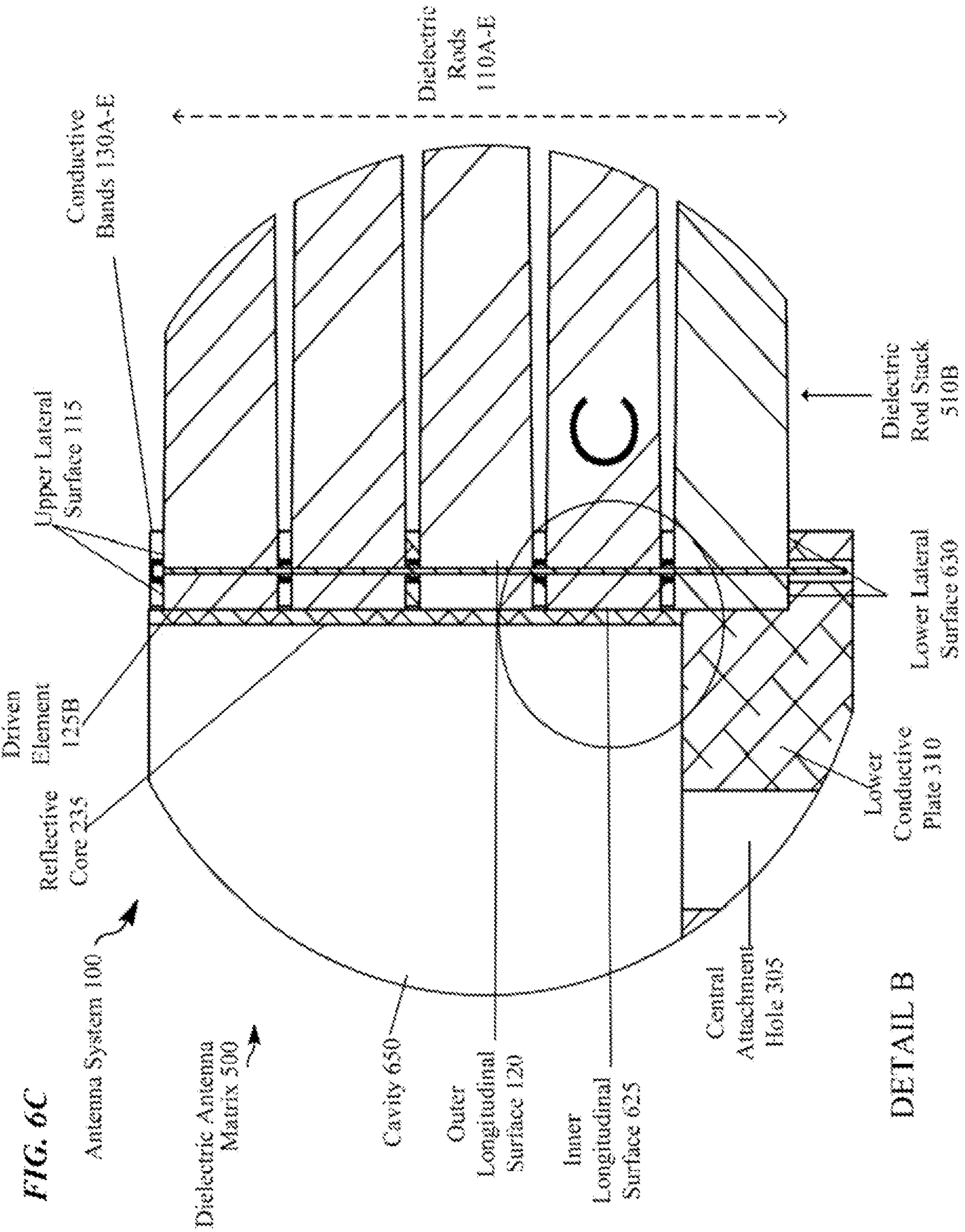
FIG. 6C is a zoomed in view of the encircled detail area of FIG. 6B and shows details of five dielectric rods of a dielectric rod stack, six conductive bands (the bottom of which is a modified lower conductive plate), a driven element, and the reflective core.
Figure 6D:
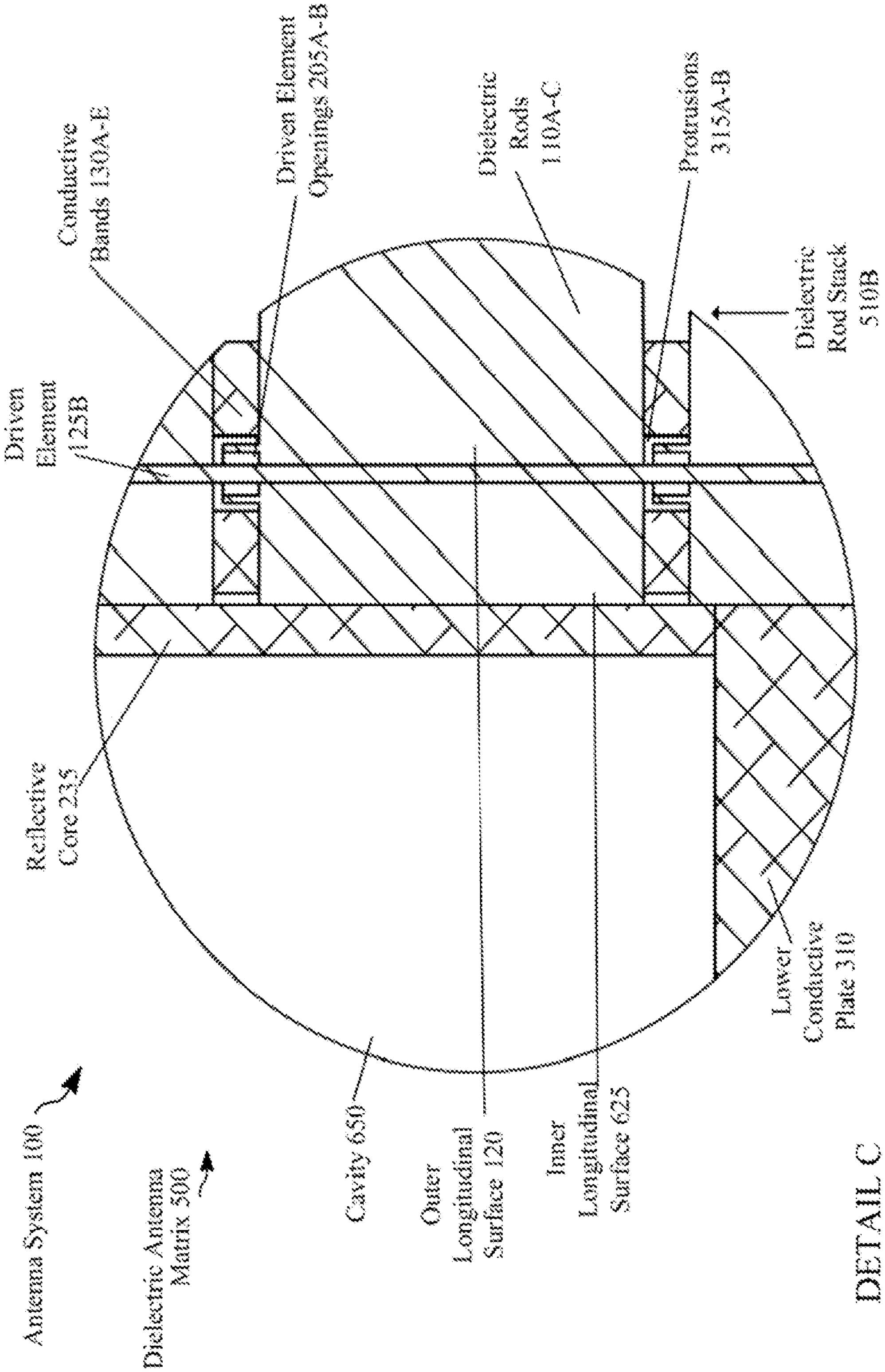
FIG. 6D is a zoomed in view of the encircled detail area of FIG. 6C and shows additional details of one full and two partial dielectric rods of a dielectric rod stack, extension of the dielectric rods from an outer longitudinal surface, and lining of an inner longitudinal surface by the reflective core.

FIG. 6A is another top view of the dielectric antenna matrix 500, with a lined through cross-section area A-A to show context for the cross-sectional view of FIG. 6B. As shown, dielectric antenna matrix 500 includes sixteen dielectric rod stacks 510A-P formed by five stacked dielectric antenna arrays 101A-E in the vertical direction. In total, there are eighty dielectric rods in the dielectric antenna matrix 500 because there are five levels of stacked dielectric antenna arrays 101A-E, each of which includes sixteen dielectric rods 110A-P.

Reflective core 235 lines the inside of the central hub 105 of each stacked dielectric antenna array 101A-E. The perimeter of the central hub 105 of the dielectric antenna matrix 500 is a circle shape, but as note above, the shape of perimeter 320 can vary (e.g., ellipse, polygon, or a portion, fraction, or combination thereof). Dielectric antenna matrix includes a central attachment hole 305. An upper conductive band 130 is formed on upper lateral surface 115 of central hub 105, which is just above the topmost stacked dielectric antenna array. The other stacked dielectric antenna arrays 101B-E also include respective conductive bands 130B-E as shown in FIGS. 6C-D. Lower conductive plate 310 is formed on lower lateral surface 630 of central hub 105, which is just below the lowest stacked dielectric antenna array 101E.

FIG. 6B is the cross-section A-A of the dielectric antenna matrix 500 of FIG. 6A. Shown in FIG. 6B is details of two dielectric rod stacks 510A-B, each of which includes respective pairs of dielectric rods 110A-E which are tapered 610 as the dielectric rods 110A-E extend further away from the central hub 105, particularly at an end (e.g., tip) of dielectric rods 110AE-E that emit and receive RF waves. Dielectric rod stacks 510A-B are each include by a respective one of the two driven elements 125A-B. In particular, each of the dielectric rods 110A-E of dielectric rod stack 510A is controlled by driven element 125A. Each of the dielectric rods 110A-E of dielectric rod stack 510B is controlled by driven element 125B. Reflective core 235 lines the inside of the central hub 105 to form an RF outward reflector and an air-filled cavity 650 is formed inside the pipe created by the reflective core 235.

FIG. 6C is a zoomed in view of the encircled detail area B of FIG. 6B of the dielectric antenna matrix 500. Shown in FIG. 6C are details of five dielectric rods 110A-E of the dielectric rod stack 510B. In the example, six conductive bands are shown. However, it can be seen that the five upper conductive bands 130A-E (e.g., metal rings) are formed somewhat differently than the sixth conductive band on the bottom, which is the lower conductive plate 310.

Lower conductive plate 310 (e.g. a metal disk) is formed on the lower lateral surface 630 of the central hub 105 to confine RF energy in the lowest dielectric rod 110E, but also is significantly larger than the conductive bands 130A-E because the lower conductive plate 310 acts as a mechanical support and can interface with the circuit board 800. Also, shown, is driven element 125B, which drives the dielectric rods 110A-E to transmit or receive RF waves in response to the control circuit 800.

FIG. 6D is a zoomed in view of the encircled detail area C of FIG. 6C of the dielectric antenna matrix 100. Depicted are additional details of one full dielectric rod 110B and two partial dielectric rods 110A and 110C of dielectric rod stack 510B. As shown, dielectric rods 110A-C extend from outer longitudinal surface 120. As further shown, inner longitudinal surface 625 is lined by the reflective core 235 and the reflective core 235 is coupled to the lower conductive plate 310. Cavity 650 is hollow and filed with air.

Figure 7A:
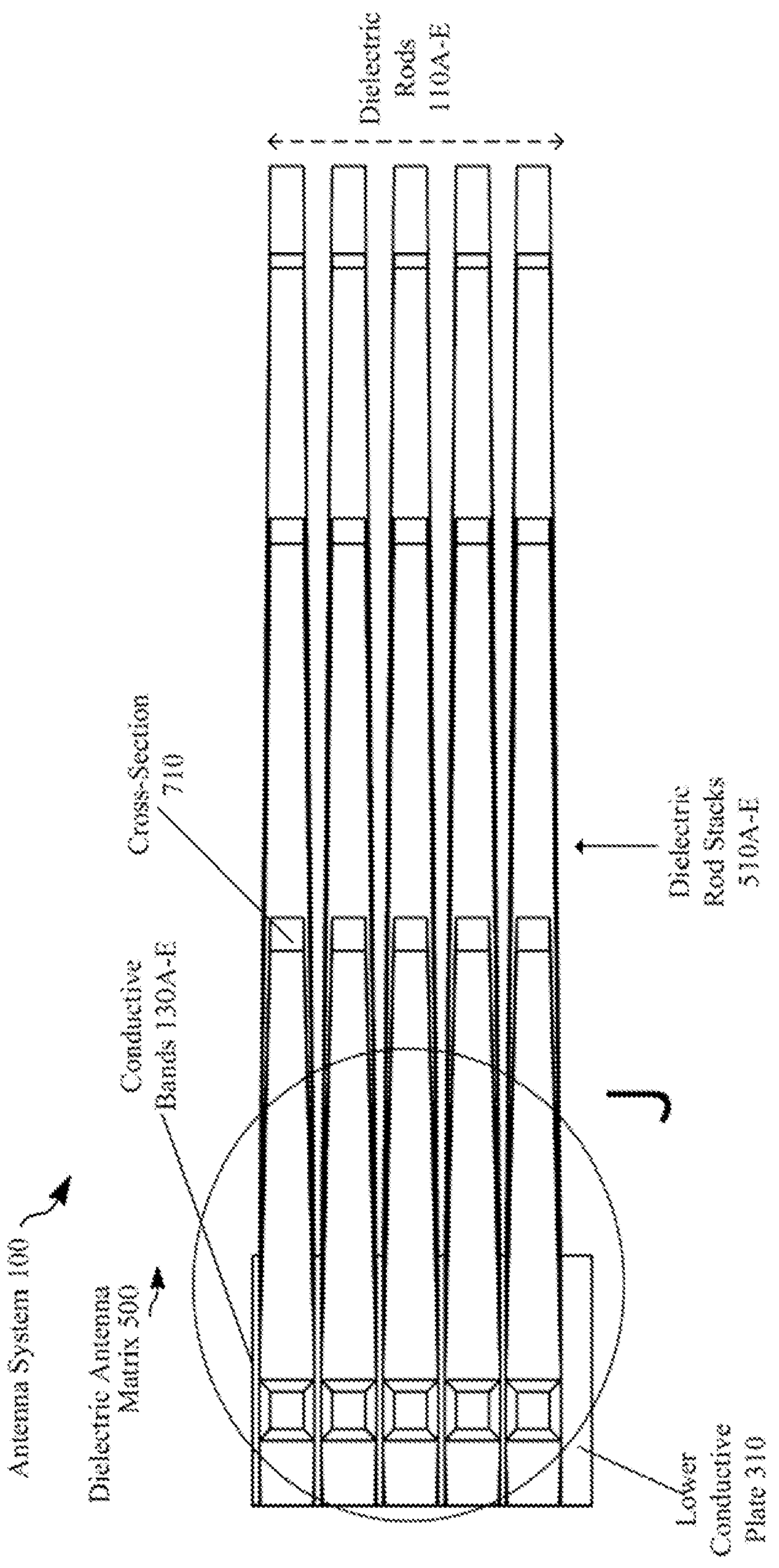
FIG. 7A is a side view of five dielectric rod stacks of the dielectric antenna matrix of FIG. 5 showing spacing, cross-sectional, and tapering details of the dielectric rods, with an encircled detail area to show context for the zoomed in view of FIG. 7B.

FIG. 7A is a side view of five dielectric rod stacks 510A-E of the dielectric antenna matrix 500. In the example, each of the dielectric rod stacks 510A-E include five dielectric rods 110A-E apiece. Due to the tapered 610 shape of dielectric rods 110A-E, the spacing between the dielectric rods 110A-E tends to increase as the dielectric rods extend further away from the central hub 105, particularly at an end (e.g., tip) of dielectric rods 110A-E that emit and receive RF waves. As shown, the cross-section 710 of dielectric rods 110A-E is square, but the cross-section 710 can be a circle; oval; polygon, such as a triangle, rectangle, pentagon, hexagon, octagon, triangle; or a portion, fraction, or combination thereof (e.g., semi-circle). Also shown are conductive bands 130A-E and lower conductive plate 310.

Figure 7B:
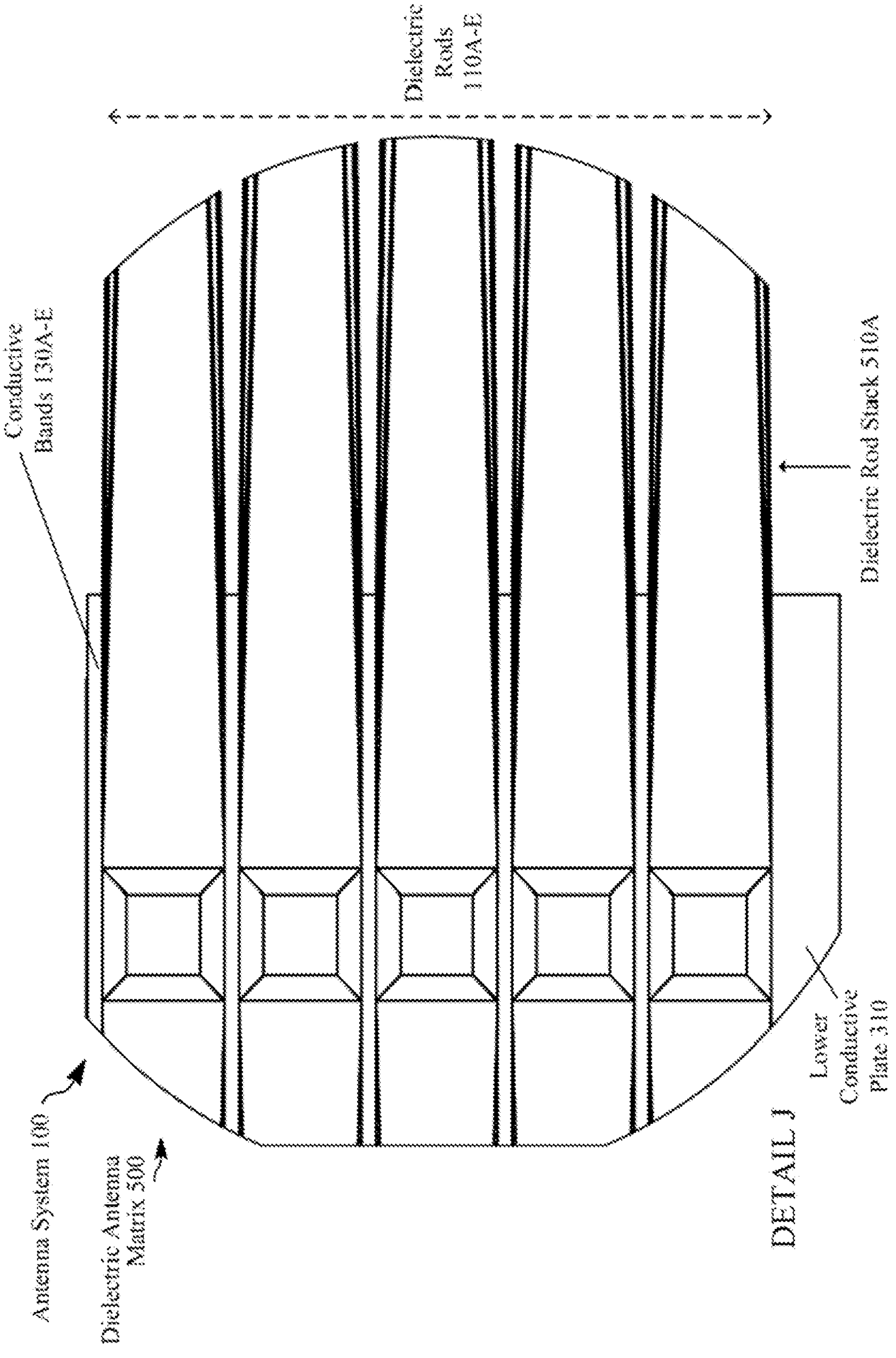
FIG. 7B is the zoomed in view of the encircled detail area of two dielectric rod stacks of FIG. 7A and shows additional details of the tapering of the dielectric rods and six conductive bands (the bottom of which is a modified lower conductive plate).

FIG. 7B is the zoomed in view of the encircled detail area J of two dielectric rod stacks of FIG. 7A. Also shown are shows additional details of the tapering 610 of the dielectric rods 110A-E. Six conductive bands, including conductive bands 130A-E and lower conductive plate 310 are also shown. Conductive bands 130A-E may be deposited or plated as a ring between each of the dielectric rods 110A-E of dielectric rod stack 510A, for example, as each of the stacked dielectric antenna arrays 101A-E are arranged vertically. Lower conductive plate be formed on the lowest stacked dielectric antenna array 101E either before, during, or afterwards stacking of the dielectric antenna arrays 101A-E.

Figure 8:
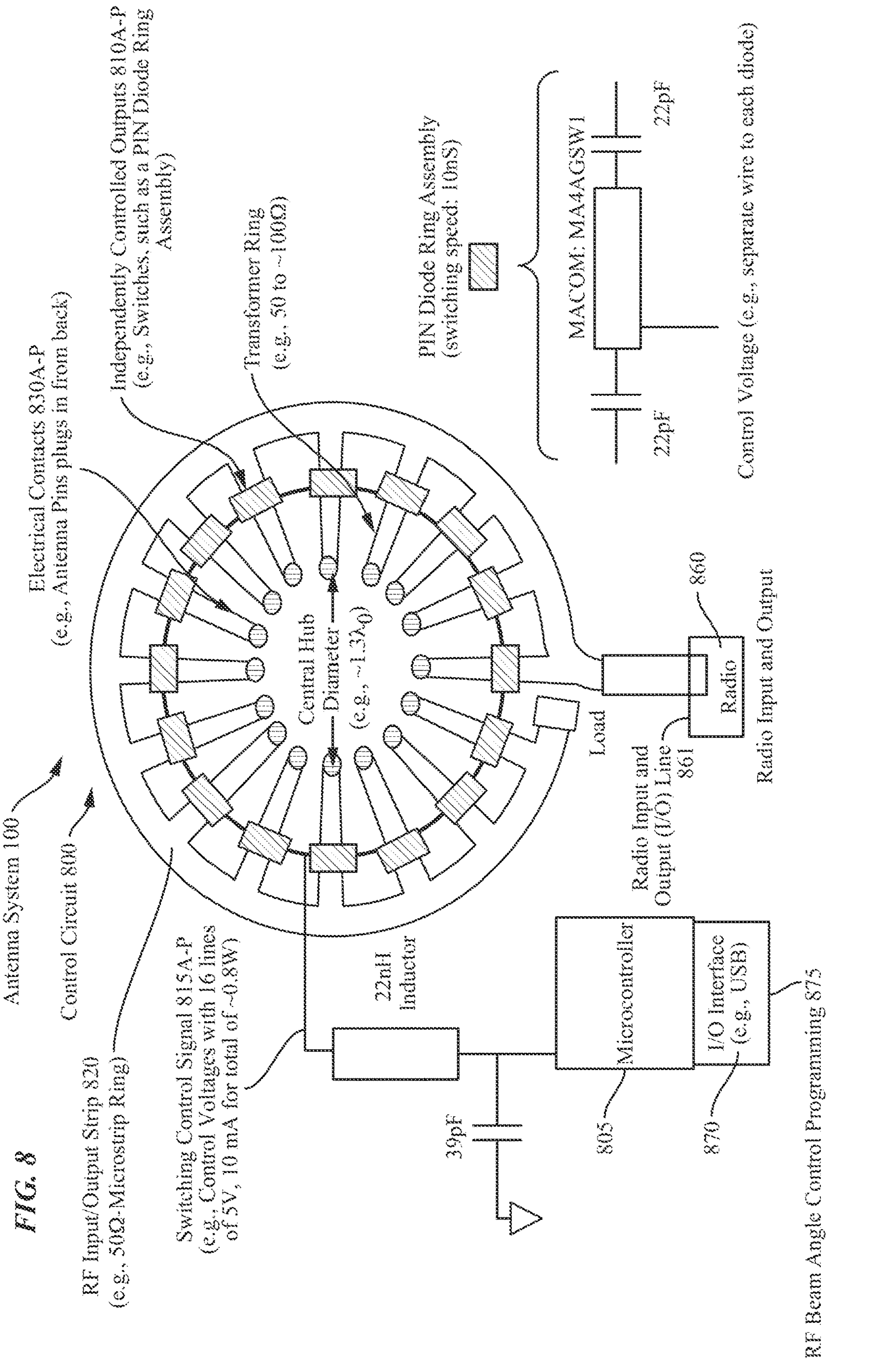
FIG. 8 is a block diagram of a control circuit of the antenna system, in which the control circuit includes a microcontroller, independently controlled outputs, and an RF input strip.

FIG. 8 is a block diagram of a control circuit 800 of the antenna system 100. As shown, the control circuit 800 includes a microcontroller 805 and multiple independently controlled outputs 810A-P. The independently controlled outputs 810A-P are coupled to the microcontroller 805. Each independently controlled output 810A-P is operated by the microcontroller 805 and coupled to a respective dielectric rod stack 510A-P to transmit or receive the RF waves via a respective driven element 125A-P.

Each independently controlled output 810A-P is configured to turn on or off based on a respective switching control signal, such as switching control 815A-P, from the microcontroller 805. Microcontroller 805 can include a memory with programming instructions to control RF beam angles (e.g., directionality) and power. The independently controlled outputs 810A-P can be switches, relays, multiplexers, demultiplexers, or transistors, which can activate or deactivate the respective dielectric rod stack 510A-P during transmission or reception of RF waves. In the example of FIG. 8, the independently controlled outputs 810A-P are switches, more specifically PIN diodes arranged in a ring assembly. Based on the respective switching control signal 815A-P, each independently controlled output 815A-P is configured to control the respective dielectric rod stack 510A-P to transmit or receive the RF waves via the respective driven element 125A-P. In the example of FIG. 8, the switching control signal 815A-P is a control voltage (e.g., 5 volts (V), 10 milliamps (mA) for total of ~0.8 Watts) run on 16 lines to the independently controlled outputs 815A-P. In some examples, the control voltage may be applied to single line and gated to the independently controlled outputs 815A-P based on a timing signal.

Control circuit 800 includes an RF input/output (I/O) strip 820 electrically connected to each independently controlled output 810A-P. In the example, the RF input/output strip 820 is a 50Ω microstrip ring. The control circuit 800 further includes a plurality of electrical contacts 830A-P, such as antenna pins that plug in from the back. Each respective electrical contact 830A-P is electrically connected to the respective driven element 125A-P and electrically connected to a respective independently controlled output 810A-P. Microcontroller 805 is configured to turn on the respective independently controlled output 810A-P with the respective control signal, such as switching control signal 815A-P, which activates and closes the respective portion of the control circuit 800. Turning on of the respective independently controlled output 810A-P, electrically connects the RF input/output strip 820 to the respective driven element 125A-P, which transmits RF radiation via selected dielectric rods 110A-P or dielectric rod stacks 510A-P (e.g., transmission mode) and/or receives RF radiation via selected dielectric rods 110A-P or dielectric rod stacks 510A-P (e.g., reception mode). Microcontroller 805 is configured turn off the respective independently controlled output 810A-P with the respective switching control signal 815A-P to electrically disconnect the RF input/output strip 820 from the respective driven element 125A-P, which deactivates and opens the respective portion of the control circuit 800.

As further shown, control circuit 800 further includes a radio 860 configured to input a RF input signal to the RF input/output strip 820 during transmission mode. Radio 860 is configured to receive an RF output signal from the RF input/output strip 820 during reception mode. Microcontroller 805 is also coupled to RF beam angle control programming 875. The RF beam angle control programming 875 can be stored in a memory, which is accessible to the microcontroller 805. Programming instructions of the RF beam angle control programming 875 are executable by the microcontroller 805. Microcontroller 805 is also coupled to an input/output (I/O) interface 870, which is a Universal Serial Bus (USB) port in the example. Alternatively or additionally, the RF beam angle control programming 875 can be received via the input/output interface 870. The RF beam angle control programming 875 can select the location and number of dielectric rods 110A-P to utilize to adjust the narrowness or breadth of the emitted and received RF beam. In order for the RF beam angle control programming 875 to control beam angle, microcontroller 805 may receive and utilize data transmitted via the I/O interface 870. This data may be generated by the radio 860, sensors included in the antenna system 100 or by independent separate standalone sensors. Additionally, the data can be received by the dielectric antenna arrays 101A-E, processed by the radio 860, and stored in the memory accessible to the microcontroller 805 for decision-making by the executed RF beam angle control programming 875. As explained previously, a relatively narrow beam can have enhanced power, which can be useful in certain settings; whereas, a broader beam may be more desirable in other settings.

Although control circuit 800 includes sixteen independently controlled outputs 810A-P and sixteen electrical contacts 830A-P in the example, the number may vary depending on the number of dielectric rods 110A-P. The number of dielectric rods 110A-P and corresponding driven elements 125A-P varies depending on how narrow an RF beam is desired. Typically, the number of dielectric rods 110A-P matches the number of driven elements 125A-P. But in some examples, there may be fewer driven elements 125A-P than dielectric rods 110A-P, for example, a single driven element 125A may drive two, three or more of dielectric rods 110A-P. Hence, the number of independently controlled outputs 810A-P and electrical contacts 830A-P may be based on the number of driven elements 125A-P instead of dielectric rods 110A-P.

Any of the microprocessor and RF beam angle control programming 875 can be embodied in one or more methods as method steps or in one more programs. According to some embodiments, program(s) execute functions defined in the program, such as logic embodied in software or hardware instructions. Various programming languages can be employed to create one or more of the applications, structured in a variety of manners, such as firmware, procedural programming languages (e.g., C or assembly language), or object-oriented programming languages (e.g., Objective-C, Java, or C++). The program(s) can invoke API calls provided by the operating system to facilitate functionality described herein. The programs can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

FIG. 9 is an isometric view of another dielectric antenna array 901 of an antenna system 101. Dielectric antenna array 901 includes a central hub 105 with multiple dielectric rods 110A-P extending outwards from the central hub 105. Dielectric rods 110A-P are arranged in a pincushion or porcupine like arrangement around the central hub 105 to customize RF beam coverage within a given environment. Central hub 105 includes an outer surface 920 and dielectric rods 110A-P extend outwards from the outer surface 920. In the depicted example, outer surface 920 is shaped as a truncated spheroid or ellipsoid, (e.g., upper half or hemisphere). Dielectric rods 110A-P are positioned to extend from various portions or locations of the outer surface 920 to be particularly sensitive to receive RF waves in the direction of the outer surface 920 (e.g., upper hemisphere) and confine transmission of RF waves in the direction of the outer surface 920 (e.g., upper hemisphere). Outer surface 920 can have a curved shape (e.g., cylinder, cone, sphere, ellipsoid, or other aspherical or spherical shape), which can be continuous. A continuous surface or wall (e.g., curved surface) can form an ellipsoid, spheroid, cone, paraboloid, or hyperboloid that may be truncated at one or both ends. Alternatively or additionally, outer surface 920 can have a polyhedron shape (e.g., cuboid, tetrahedron, etc.) or a portion, fraction, or combination thereof. The pincushion or porcupine arrangement can be useful in applications where the received or transmitted RF waves are confined to an aerial direction (e.g., satellites).

As further demonstrated in the example of FIG. 10, each of the driven elements 125A-P can be formed of crossed monopoles, depicted as driven element polarization components 1000A-B, to control polarization of RF signals transmitted through one of the respective dielectric rods 110A-P. Driven element polarization components 1000A-B can be formed of a conductive medium, such as a metal wire, and pass across each other at a crossing angle 1005, which is about 90°, in the example. Driven element polarization components 1000A-B are insulated from each so as to not electrically connect. For example, crossed driven element polarization components 1000A-B together control polarization of RF signals directed through dielectric rod 110A via connectors 1020A-B by changing phase of RF waves relative to each other via the driven element polarization components 1000A-B. By utilizing crossed driven element polarization components 1000A-B for each of the driven elements 125A-B of the antenna system 100, the dielectric antenna array 101 can be configured to be sensitive to linearly polarized (e.g., horizontal or vertical) or circularly polarized RF signals. As shown in FIG. 10, the driven element 125A is connected to the radio 860 via electrical contacts like that shown in FIG. 8. However, instead of a single electrical contact 830A like that shown in FIG. 8 for driven element 125A, each of the crossed driven element polarization components 1000A-B that form the driven element 125A electrically connect through a separate respective electrical contact 1035A-B to the radio 860.

Figure 11A:
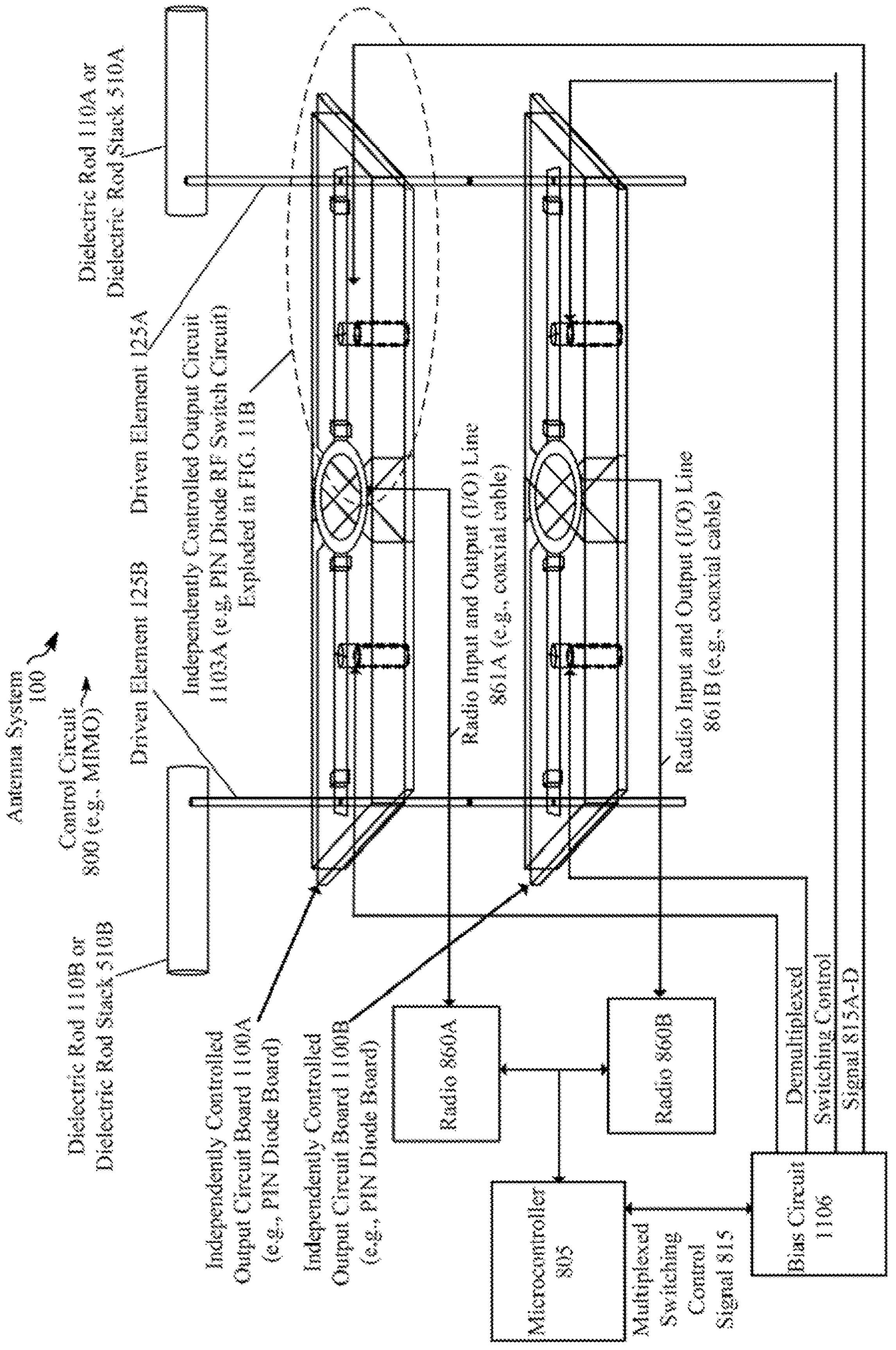
FIG. 11A depicts a block diagram of the control circuit of the antenna system 100 like that shown in FIG. 8 that utilizes a multiple-input and multiple-output (MIMO) architecture.

FIG. 11A depicts a block diagram of a control circuit 800 of the antenna system 100 like that shown in FIG. 8 that utilizes a multiple-input and multiple-output (MIMO) architecture. MIMO multiplies the capacity of the radio 860A-B links, for example, utilizing the dielectric antenna matrix 500 of FIG. 5 to exploit multipath propagation. Control circuit 800 includes the microcontroller 805 and multiple radios 860-N, of which two radios 860A-B are shown. Each respective radio 860A-B is connected to a respective radio input and output (I/O) line 861A-B. Thus, the respective radio input and output (I/O) line 861A-B is connected to a respective independently controlled output circuit board 1100A-B through the respective radio input and output (I/O) line 861A-B. The respective radio input/output (I/O) line 861A-B can include a coaxial cable and a semi-precision coaxial RF connector, such as a subminiature version A (SMA).

The microcontroller 805 incorporating beam management algorithms provides signals to command activation of desired dielectric rods 110A-P or dielectric rods stacks 510A-P. The control circuit 800 provides complete flexibility in selection of which dielectric rod 110A-P is activated at a given time. The microcontroller 805 interfaces with one or more radios 860A-N that provide communication protocols and signals for transmission/reception through the dielectric rods 110A-P. Control circuit 800 may incorporate a PIN diode ring network to maximize switching speed and flexibility. The dielectric rods 110A-P may be fabricated from plastic, Teflon®, or other dielectric materials.

Control circuit 800 may further include a bias circuit 1106 that is connected to the microcontroller 805. Bias circuit 1106 receives a multiplexed switching control signal 815 (e.g., a digital or analog signal) from the microprocessor 805 and demultiplexes the switching control signal 815 into sixteen separate demultiplexed switching control signals 815A-P (e.g., analog voltages) for each independently controlled output circuit board 1100A-B. Each of the sixteen demultiplexed switching control signals 815A-P are electrically conveyed to each of the independently controlled output circuit boards 1100A-B in order to turn on or off respective independently controlled outputs 810A-P. In the view shown, only four demultiplexed switching control signals 815A-P are shown—two per independently controlled output circuit boards 1100A-B. Bias circuit 1106 establishes predetermined voltages and currents for the independently controlled output circuit boards 1100A-B to properly operate independently controlled output circuits 1103A-P to switch on or off respective independently controlled outputs 810A-P.

In an example, each of the independently controlled output circuit boards 1100A-B include sixteen independently controlled output circuits 1103A-P (e.g., PIN diode RF switch circuits). However, only two independently controlled output circuits 1103A-B are shown in the cross-sectional views of the depicted portions of the two independently controlled output circuit boards 1100A-B. As further shown, independently controlled output circuit 1103A is identified as the area enclosed with the oval of broken lines.

In the example of FIG. 11A, additional dielectric rods 110 (e.g., polyrods) ports can be added to each RF input/output strip 820 ring to increase the number of dielectric rods 110A-P beyond sixteen. Also dielectric rods 110 (e.g., polyrods) ports can be removed to decrease the number of dielectric rods 110A-P to less than sixteen. Moreover, the number of radios 860A-B can be increased to more than two by adding an additional independently controlled output circuit board 1100N (e.g., PIN diode board) for each additional radio 860N.

Figure 11B:
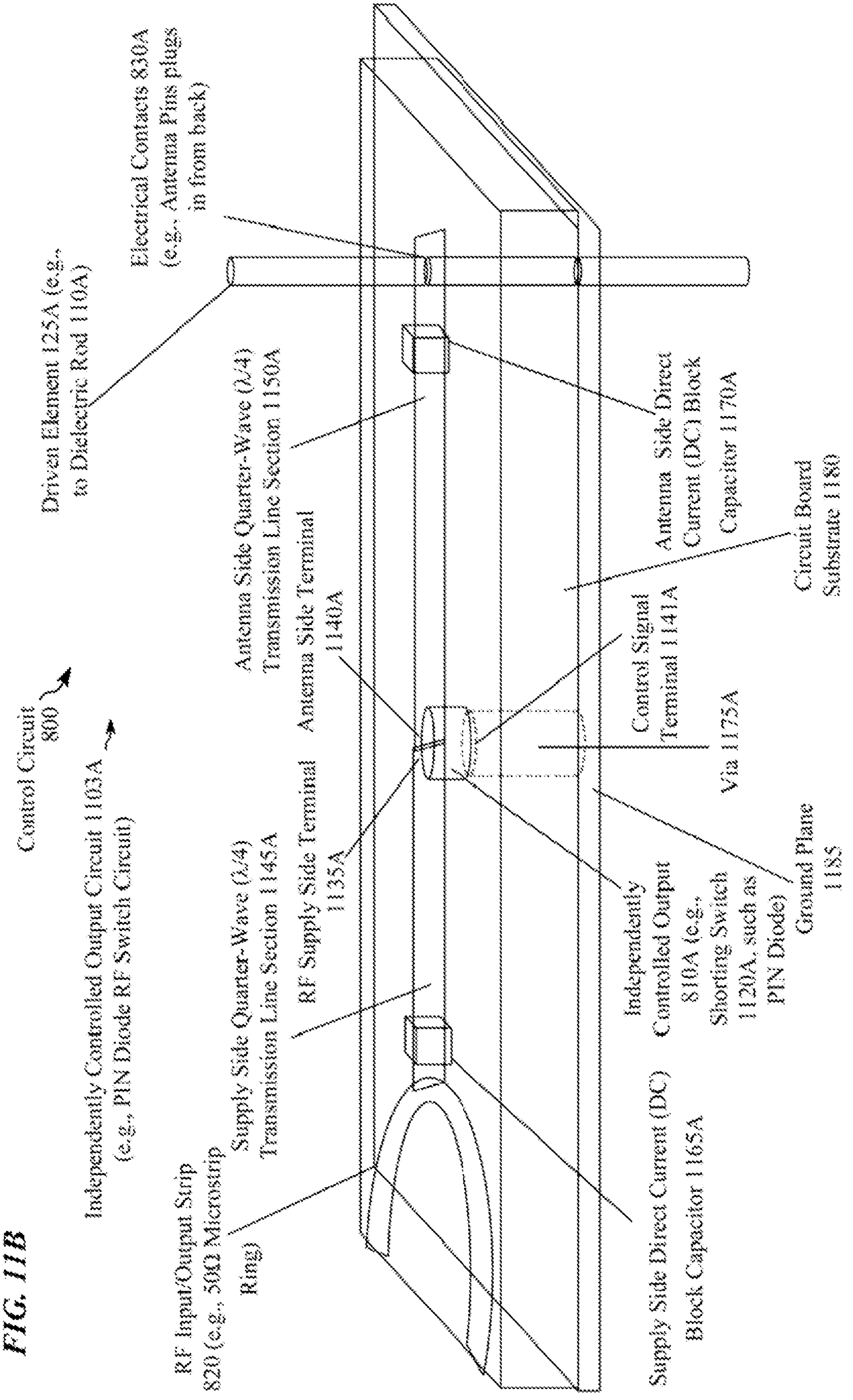
FIG. 11B is an exploded view of an independently controlled output circuit shown in FIG. 11A.

FIG. 11B is an exploded view of the independently controlled output circuit 1103A shown in FIG. 11A. In an example, each of the sixteen independently controlled output circuits 1103A-P includes a respective independently controlled output 810A-P, such as a shorting switch 1120 (e.g. a PIN diode, such as a reflective type of PIN diode). Hence, each of the independently controlled output circuits 1103A-P includes a respective shorting switch 1120A-P (e.g., PIN diode), and the independently controlled outputs 810A-P collectively form an array of shorting switches 1120A-P. In the example, there is one PIN diode 1120A per dielectric rod 110A and the PIN diode utilized is manufactured by MACOM as part numbers MA4AGP90 or MA4AGSW1. Each shorting switch 1120A-P can include a respective RF supply side terminal 1135A-P, a respective antenna side terminal 1140A-P, and at least one respective control signal terminal 1141A-P (e.g., an anode terminal and a cathode terminal).

Each of the independently controlled output circuits 1103A-P includes a respective supply side quarter-wave (λ/4) transmission line section 1145A-P (which is a quarter-wave or odd multiples thereof, such as three-quarter-wave, five-quarter-wave, etc.) coupled to the respective RF supply side terminal 1135A-P of the respective shorting switch 1120A-P. The respective supply side quarter-wave transmission line section 1145A-P is also coupled to the RF input/output strip 820. Each of the independently controlled output circuits 1103A-P includes a respective antenna side quarter-wave (λ/4) transmission line section 1150A-P (which is a quarter-wave or odd multiples thereof, such as three-quarter-wave, five-quarter-wave, etc.) coupled to the respective antenna side terminal 1140A-P of the respective shorting switch 1120A-P. The respective antenna side quarter-wave transmission line section 1150A-P is also coupled to a respective electrical contact 830A-P. Hence, the respective shorting switch 1120A-P is coupled between the respective supply side quarter-wave (λ/4) transmission line section 1145A-P and the respective antenna side quarter-wave (λ/4) transmission line section 1150A-P.

The supply side quarter-wave (λ/4) transmission line sections 1145A-P and antenna side quarter-wave (λ/4) transmission line section 1150A-P can include a coaxial cable, a microstrip, a waveguide, or other suitable quarter-wave medium. In an example 5G hub microstrip design, the supply side quarter-wave (λ/4) transmission line sections 1145A-P and antenna side quarter-wave (λ/4) transmission line sections 1150A-P short at the location of the PIN diode when the respective PIN diode 1120A-P is forward biased. The shorted PIN diode is transformed to an open circuit at the supply RF input/output strip 820 and the antenna terminal by the respective quarter-wave sections of transmission line. When the PIN diode is reversed biased, the antenna side quarter-wave (λ/4) transmission line sections 1150A-P transforms the characteristic impedance of the supply line to the desired driving impedance of the antenna for maximum power transfer.

In some examples, each of the independently controlled output circuits 1103A-P can include a respective supply side direct current (DC) block capacitor 1165A-P and a respective antenna side DC block capacitor 1170A-P. The respective supply side quarter-wave transmission line section 1145A-P can be coupled to the RF input/output strip 820 through the respective supply side direct current (DC) block capacitor 1165A-P. The respective antenna side quarter-wave transmission line section 1150A-P can be coupled to the respective electrical contact 830A-P through the respective antenna side DC block capacitor 1170A-P.

Each respective shorting switch 1120A-P is configured to be connected to ground through a respective via 1175A-P formed on and/or in a circuit board substrate 1180 of the independently controlled output circuit board 1100A. In the printed circuit board (PCB) design of the control circuit 800, the respective via 1170A-P includes two electrical pads in corresponding positions on different parts of the circuit board substrate 1180, which are electrically connected by a hole through the circuit board substrate 1180 of the independently controlled output circuit board 1100A. The hole can be made conductive by electroplating or can be lined with a tube or a rivet to create an electrical interconnect that connects to the ground plane 1185 of the independently controlled output circuit board 1103A. Blind vias or through hole types of vias and various other types of electrical interconnects, such as surface interconnects, internal or external conductive traces, and planar electrodes can be utilized for electrical connection.

When the respective shorting switch 1120A-P is switched (turned) on (e.g., low impedance state) by the respective switching control signal 815A-P applied to the least respective one control signal terminal 1141A-P, then the respective shorting switch 1120A-P shorts to the ground plane 1185 (ground) by the respective via 1175A-P. This appears as an open circuit through the respective supply side quarter-wave transmission line section 1145A-P back to the RF input/output strip 820. When the respective shorting switch 1120A-P is switched (turned) off (e.g., high impedance state), the RF signals (waves) pass over the respective shorting switch 1120A-P between the respective supply side quarter-wave transmission line section 1145A-P and the respective antenna side quarter-wave transmission line section 1150A-P.

Figure 12:
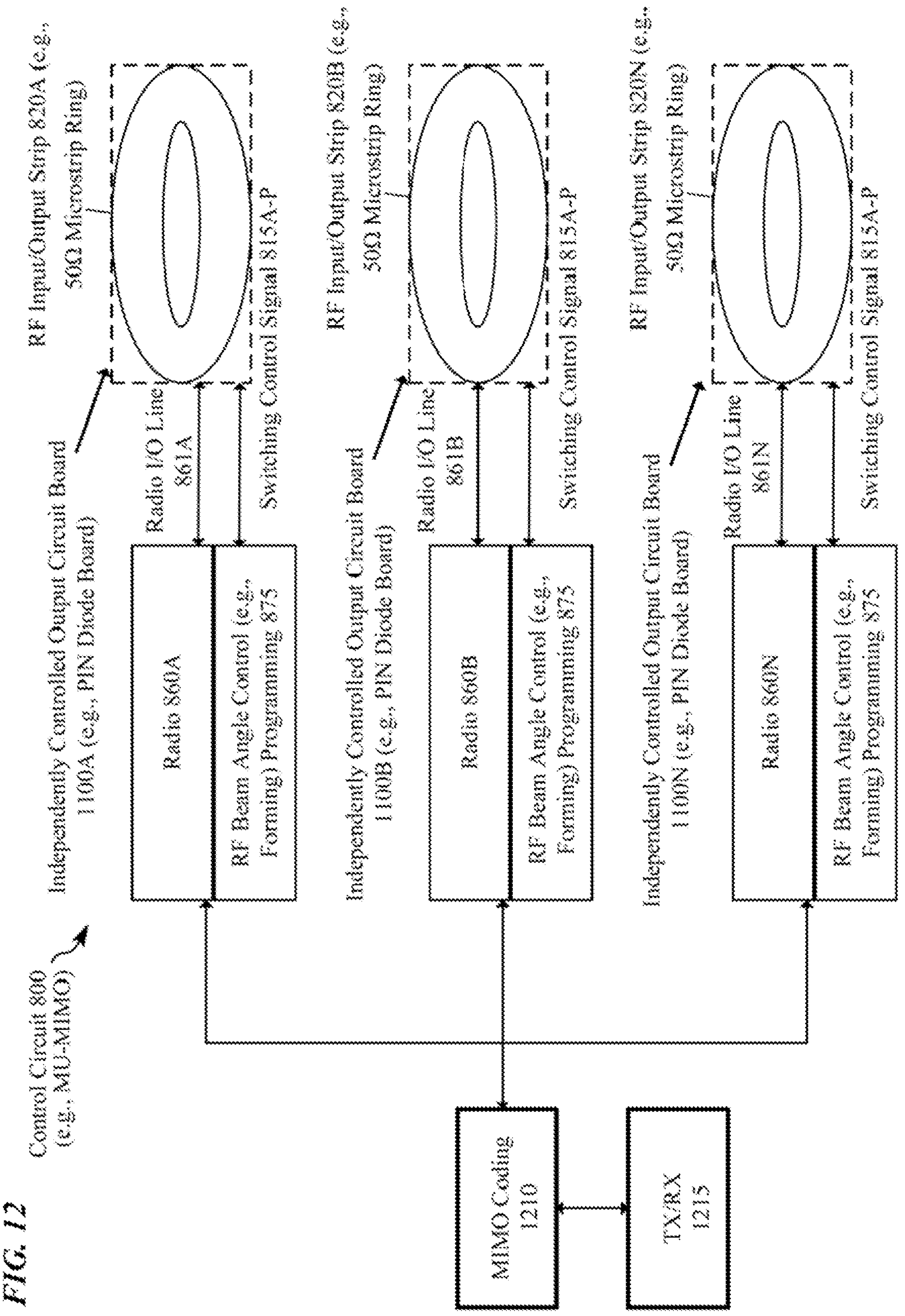
FIG. 12 illustrates a schematic of a multiple user multiple-input and multiple output (MU-MIMO) architecture like that shown in FIGS. 8 and 11A-B, which employs multiple RF channels to service multiple users per channel.

FIG. 12 illustrates a schematic of a multiple user multiple-input and multiple output (MU-MIMO) architecture like that shown in FIGS. 8 and 11A-B, which employs multiple RF channels to service multiple users per channel. Each radio 860A-C can be centered on a different RF frequency channel. Control circuit 800 includes multiple radios 860A-N, of which three radios are shown. Each respective radio 860A-N may be connected to a respective radio input/output (I/O) line 861A-N. Each respective independently controlled output circuit board 1100A-B includes a respective RF input/output strip 820A-N connected to the respective radio input/output (I/O) line 861A-N to convey (during transmission or reception) the RF signals (waves) to and from the respective radio 860A-N. A respective switching control signal 815A-P may turn on or off a respective independently controlled output 810A-P of the respective RF input/output (I/O) strip 820A-N of the independently controlled output circuit board 1100A-B. Each respective RF input/output (I/O) strip 820A-N is connected to the respective radio input/output (I/O) line 861A-N. Switching control signals 815A-P can be generated based on the RF beam angle control (e.g., forming) programming 875 stored in a memory and executed by the microprocessor 805 or by I/O interface 870 (e.g., USB 232) as shown in FIG. 8.

As further shown, control circuit 800 includes a MIMO coding block 1210 and a transmission (TX) and reception (RX) block 1215. MIMO coding block 1210 can be based on 802.11 techniques. The MIMO coding block 1210 can be programming that is controlled by the TX/RX block 1215. MIMO is a technique for multiplying the capacity of one or more radio 860A-N links using multiple transmit and receive dielectric antenna arrays 101A-N to exploit multipath propagation. For example, dielectric antenna arrays 101A-N may transmit or receive in a range from 100 megahertz (MHz) to 40 gigahertz (GHz). The antenna system 100, which includes the control circuit 800 of independently output circuit boards 1110A-N. Independently output circuit boards 1110A-N included multiple independently controlled output circuits 1103A-P (arranged as a switching matrix), which allows the user (via the MIMO coding block 1210) to set which radios 860A-N, modulation schemes, and dielectric antenna arrays 101A-N should be activated to transmit and receive for this purpose.

In one MU-MIMO example, control circuit 800 of antenna system 100 includes eight independently controlled output circuit boards 1100A-H, each of which is connected to respective radios 860A-H, and then chained together via coaxial interconnects. The connection of multiple RF chains can be connected and, in principle, enables as many independent radio beams as there are dielectric rods 110A-P in the antenna array 101A-N (e.g., two independent RF chains as shown in FIG. 11A or as many as eight independent RF chains as described in FIG. 12). Multiple antenna elements (dielectric rods 110A-P) can be activated simultaneously, from one to several to all, in any desired configuration. By activating adjacent dielectric rods 110A-P in a prescribed manner, the resulting beam can be steered (within limits) in azimuth or elevation. A 28 GHz antenna system 100 can achieve a transmission range greater than 500 meters (line of sight) with an effective radiated power of 1-10 Watts (W). The power input can be adjusted to enable a desired transmission range and data rate. In one example, the dielectric antenna matrix 500 includes three dielectric antenna arrays 101A-C with a hub and spoke design for a total of 54 individual dielectric rods arranged in 3 stacked dielectric antenna arrays 101A-C of 18 dielectric rods 110A-P each. This enables full coverage of a 360 degree region with a single antenna system 100. The shape of the antenna system 100 can be modified for specific use cases, including a single or multi-layered ring, a sphere with radially protruding dielectric rods 110A-P, or other shapes as desired. Dielectric rods 110A-P can be canted (slanted) at any angle to optimize beam pattern and coverage. Dielectric rods 110A-P may be attached in a modular fashion to enable flexible use and modification.

The shape of the dielectric rods 110A-P can be customized for specific use cases. In one example, the dielectric rods 110A-P are 9 wavelengths long with a circular cross section and a taper. The length of the dielectric rods 110A-P can be adjusted to achieve different frequencies, gain, and beamwidth. The shape and taper of the dielectric rods 110A-P can be adjusted to optimize beam profile.

Each of the independently controlled output circuit boards 1100A-H includes sixteen independently controlled output circuits 1103A-P (e.g., PIN diode RF switch circuits). Each independently controlled output circuit 1103A-P includes a respective independently controlled output 810A-P (e.g., arranged as an array of sixteen PIN diode shorting switches) and respective quarter-wave transmission lines 1145A-P, 1150A-P. This approach allows any subset (or all) stacked dielectric antenna arrays 101A-H in the dielectric antenna matrix 500 connected to the independently controlled outputs 810A-P to be driven by any subset (or all) of the radios 860A-H. The approach provides maximum efficiency and flexibility in beam steering (and forming) to be achieved at low loss with a minimum number of components. Hence, no phase shifters are required in the antenna system 100, but phase shifters can be included if desired. When the PIN diode 1120A-P type of independently controlled output 810A-P is forward biased from the switching control signal 815A-P being switched (turned) on, the PIN diode connects the RF signal (e.g., RF supply signal) to/from the radio 860 to ground during transmission or reception mode. When viewed back through the quarter-wave length of transmission line, being switched (turned) on appears as an open to the RF signal from the radio 860A-H. When the PIN diode 1120A-P type of independently controlled output 810A-P is reversed biased from the switching control signal 815A-P being switched (turned) off, the PIN diode isolates the RF signal to/from the radio 860A-H from ground, allowing the RF signal to pass over the PIN diode 1120A-P to any subset (or all) of the stacked dielectric antenna arrays 101A-H at very low loss.

In FIG. 12, all dielectric antenna arrays 101A-N are connected to each independently controlled output circuit board 1100A-N, including the independently controlled output circuits 1103A-P, which can collectively form a PIN diode ring (i.e., PIN diode switching matrix). This architecture permits any radio 860A-N access to any dielectric antenna array 101A-N. Indeed, it should be noted that the PIN diode ring as described can operate with any type of antenna array properly connected to the PIN diode ring, e.g., polyrods, microstrip patches, or feedhorns.

As explained above, using switches and splitters with MIMO can allow up to 8 multi-transmits and receives at any one time. Because the switching matrix network can accommodate 8 more channel paths by adding eight inputs and outputs, massive MIMO applications can be accommodated. The combination of switching and splitters for a radio signal fan out at 28 GHz and conversion stages for both up and down conversion to <10 GHz from 28 GHz provides versatility of any given spoke to be used as a transmit or receive to provide SISO (single input single output) and 2-degree MIMO.

Figure 13A:
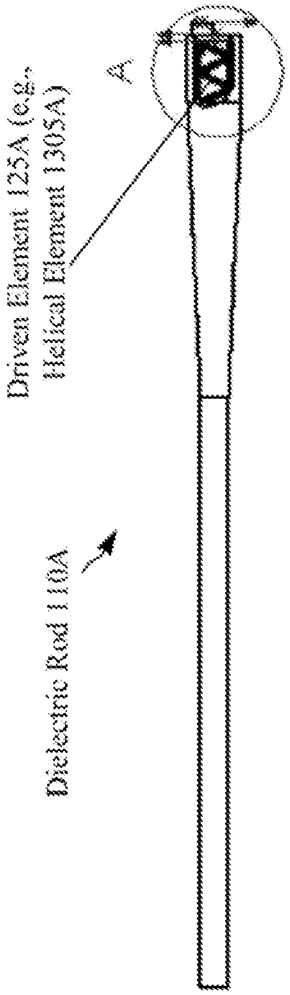
FIG. 13A is side view of the dielectric rod of the dielectric antenna array of FIG. 1, with an encircled detail area A to show context for the cutout view of FIG. 13B.
Figure 13B:
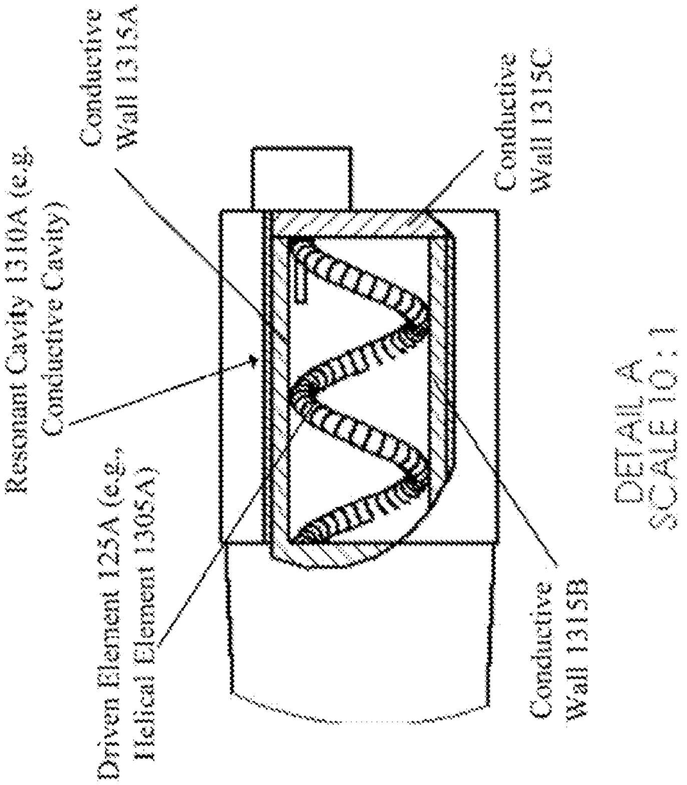
FIG. 13B is the cutout view of the encircled detail area A of the dielectric rod of FIG. 13A, and shows details of a single dielectric rod and the driven element, which is a helical element, surrounded by a resonant cavity.

FIG. 13A is side view of the dielectric rod 110A of the dielectric antenna array 101A of FIG. 1, with an encircled detail area A to show context for the cutout view of FIG. 13B. As shown, a respective dielectric rod 110A is driven by a respective driven element 125A. The driven element 125A is a helical element 1305A with a structure that looks like a spring, composed of one or more turns. Each turn has a circumference of approximately one wavelength, separated by approximately 0.225 wavelengths. The respective helical element 1305A is embedded in the base of the respective dielectric rod 110A. Embedding can be achieved by, for example, inserting the helical element 1305A inside an injection mold and flowing the polymer material forming the respective dielectric rod 110A through and/or around the respective helical element 1305A. In the example, creating a helix design can achieve an 8 decibel (dB) gain and reduce cost. The microstrip can be integrated with the stripline helix and dielectric rod 110A all in the same substrate to create a one piece antenna assembly instead of a multi-piece manual wire turned helix that is adhesively attached to the dielectric rod 110A cylinder.

FIG. 13B is the cutout view of the encircled detail area A of the dielectric rod 110A of FIG. 13A, and shows details of a single dielectric rod 110A and the driven element 125A, which is a helical element 1305A, surrounded by a resonant cavity 1310A. Each respective resonant cavity 1310A-P (e.g., conductive cavity) includes and is formed of respective conductive walls 1315A-C, which surround the respective helical element 1305A-P. Conductive walls 1315A-C of the respective resonant cavity 1310A-P reflect the RF energy inside the respective dielectric rods 110A-P similar to the reflective core 235 and conductive inserts 119A-P described previously. Helical elements 1305A-P and resonant cavities 1310A-P (including conductive walls 1315A-C) may be formed of any suitable conductor or metallization layer, such as copper, aluminum, silver, etc., or a combination thereof.

As further demonstrated in the example of FIGS. 13A-B, each dielectric rod 110A-P can be excited by a driven element 125A-P, which is a respective helical element 1305A-P embedded in the base of the respective dielectric rod 110A-P, for example, inside a respective resonant cavity 1310A-P. The respective helical element 1305A-P can be configured to provide right hand circular polarization (RCP), left hand circular polarization (LCP), or both RCP and LCP. Each helical element 1305A-P is inherently broadband, allowing the dielectric rods 110A-P to operate over wide bandwidths (≥30%).

Various polarization control states of RF waves (signals) can be achieved by driving the dielectric antenna array 101 with different types of driven elements 125A-P. As shown in the example of FIG. 6D, the dielectric antenna array 101 can be driven by monopoles to achieve linear polarization. Thus, each of the driven elements 125A-P can include a respective monopole that transmits or receives linearly polarized RF waves. As shown in the example of FIG. 10, the dielectric antenna array 101 can be driven by crossed monopoles to achieve dual linear or circular polarization. Thus, each of the driven elements 125A-P can include respective crossed monopoles (shown as driven element polarization components 1000A-B in FIG. 10) that transmit or receive dual linearly or circularly polarized RF waves. Here "dual" means receive either vertically or horizontally polarized signals. Circularly polarized waves can be created, if desired, by feeding the crossed monopoles (shown as driven element polarization components 1000A-B in FIG. 10) the same RF signal, but with a plus/minus 90 degrees phase difference. As shown in the example of FIGS. 13A-B, the dielectric antenna array 101 can be driven by embedded helical elements to achieve circular polarization. Thus, each of the driven elements 125A-P can include respective helical elements 1305A-P as shown in FIGS. 13A-B that transmit or receive circularly polarized RF waves. Circular polarization may provide maximum flexibility in support of mobile users.

Hence, the antenna system 100 of FIG. 1 can include an antenna array 101 that includes sixteen dielectric rods 110A-P and sixteen helical elements 1305A-P serving as the driven elements 125A-P. Each dielectric rod 110A-P is driven by a respective helical element 1305A-P to transmit or receive RF waves (signals). Each of the sixteen respective helical elements 1305A-P is surrounded by a respective resonant cavity 1310A-P. The dielectric rods 110A-P can originate from the central hub 105 of the dielectric antenna array 101 as shown in FIG. 1 or can be stacked as multiple dielectric antenna arrays 101A-E like that shown in FIG. 5.

When dielectric antenna arrays 101A-E are stacked, there may be eighty (80) separate helical elements 1305 to control each of the five dielectric rods 110A-E in the respective dielectric rod stack 510A-P independently (separately).

Figure 14:
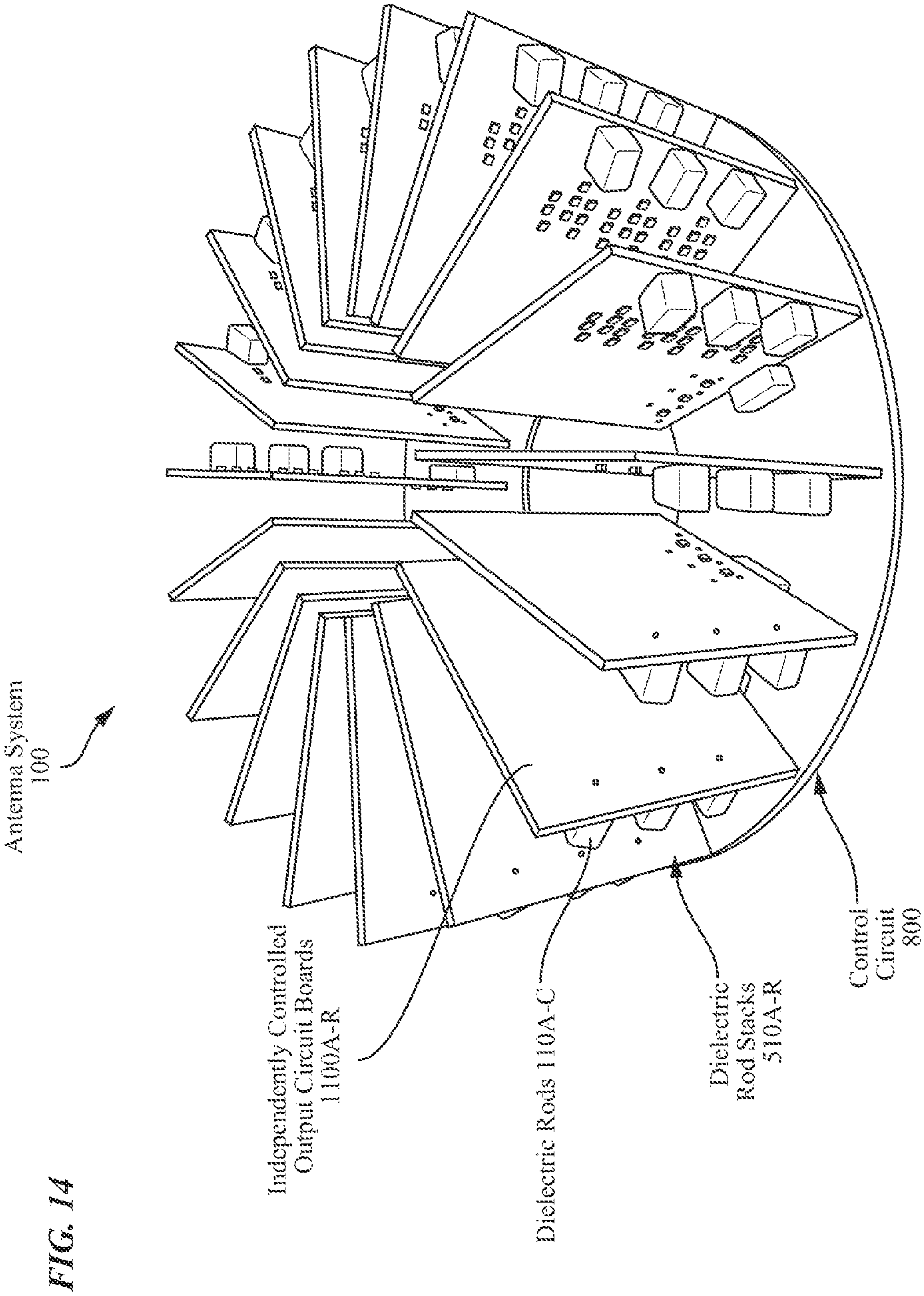
FIG. 14 depicts an antenna system which includes independently controlled output circuit boards integrated with dielectric rods in a switching matrix assembly.

FIG. 14 depicts an antenna system 100 which includes eighteen independently controlled output circuit boards 1100A-R integrated with three dielectric rods 110A-C each in a switching matrix assembly arrangement. As shown, each independently controlled output circuit board 1100A-R is installed vertically to create the switching matrix assembly. Each independently controlled output circuit board 1100A-R can include a respective dielectric rod stack 510A-R comprising three respective dielectric rods 110A-C each. Thus, as shown, each dielectric rod stack 510A-R includes a minimum of three radiating dielectric rods 110A-C. In the FIG. 14 example, each of the eighteen independently controlled output circuit boards 1100A-R can be 20 degrees apart allowing for 360 degree coverage. This approach for digital vertical and horizontal beam forming and steering allows customization of antenna angles for end applications and full implementation of beam forming/steering without the use of cables or complex cable harnesses and the ability to increase layer count of radiating elements.

Dielectric rods 110A-C are activated by a helical element 1305A-C associated with each dielectric rod 110A-C to provide circular polarization. The respective helical element 1305A-C may be integrated onto an independently output circuit board 1100A-R at 28 GHz to simplify fabrication. Dielectric rods 110A-C can be attached to a modular stackboard that attaches to the depicted control circuit 800 using, for example, an all-in-one process to minimize cost.

In the examples described herein, the number and spacing of dielectric rods 110A-P can be customized for specific use cases and to minimize the reduction in RF signals between each dielectric rod 110A-P. Each dielectric rod 110A-P can be independently activated by a respective driven element 125A-P. Each dielectric rod 110A-P can receive and transmit RF signals. A control circuit 800 is implemented to allow complete flexibility in selection of which dielectric rod 110A-P is activated at any given time and to enable switching between dielectric rods 110A-P. The control circuit 800 may incorporate PIN diodes 1103A-P as independently controlled outputs 810A-P that enable very rapid RF beam switching. A microcontroller 805 incorporating RF beam management algorithms provides signals to the control circuit 800 to command activation of desired dielectric rods 110A-P to convey RF signals.

The microcontroller 805 interfaces with one or more radios 860A-N that provide the communication protocols and signals for RF wave transmission through the dielectric rods 110A-P. Multiple dielectric rods 110A-P can be activated simultaneously, from one to several to all. Rings of dielectric rods 110A-P, such as dielectric antenna arrays 101A-E, can be stacked on top of each other to provide additional coverage. Dielectric rods 110A-P can be attached in a modular fashion via a stackboard that allows flexibility in the number of dielectric rods 110A-P that are vertically stacked. Dielectric rods 110A-P can be canted at any angle to provide optimal vertical coverage. The shape of each dielectric rod 110A-P can be customized to produce optimal or desired beam profile and tapered to reduce side lobes. The length of each dielectric rod 110A-P can be customized for specific RF frequencies, gain, and beamwidth. By activating adjacent dielectric rods 110A-P in a prescribed manner, the resulting RF beam can be steered vertically or horizontally. The power input to the antenna system 100 can be adjusted to enable desired data rates and transmission ranges. By activating adjacent dielectric rods 110A-P, an RF beam can be made to emanate from between dielectric rods 110A-P to minimize the reduction in gain as users move around the coverage area. Multiple RF chains can be connected, in principle, enabling as many independent RF beams as there are dielectric rods 110A-P in the antenna arrays 101A-E. The antenna system 100 can be used for both RF transmission and reception and can support single user MIMO, multi-user MIMO, and SISO. The shape of the antenna system 100 can be modified for specific use cases, including a single or multi-layer ring, a sphere with radially protruding dielectric rods 110A-P, and other shapes as desired.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms “comprises,” “comprising,” “includes,” “including,” or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by “a” or “an” does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An antenna system comprising:

a plurality of dielectric rod stacks;

a control circuit including a plurality of independently controlled output circuit boards, the control circuit further including a microcontroller and multiple radios;

wherein each independently controlled output circuit board includes a respective dielectric rod stack, and the respective dielectric rod stack includes a plurality of respective dielectric rods;

wherein each of the respective dielectric rods is driven by a driven element; and wherein the control circuit selects: (i) the dielectric rod stacks, and (ii) the respective dielectric rods of the respective dielectric rod stack to adjust a beam of emitted or received radio frequency (RF) waves and achieve dual linear or circular polarization.

2. The antenna system of claim 1, wherein each of the multiple radios is connected to a respective radio input and output line.

3. The antenna system of claim 1, wherein the driven element includes crossed monopoles that are configured to achieve the dual linear or circular polarization.

4. The antenna system of claim 3, wherein the crossed monopoles are crisscrossed at an angle of about 90° and embedded in each of the independently controlled output circuit boards.

5. The antenna system of claim 3, wherein the crossed monopoles include metal wires passing across each other at the crossing angle of about 90° to transmit or receive dual linearly or circularly polarized RF waves.

6. The antenna system of claim 5, wherein the circularly polarized RF waves are created by feeding the crossed monopoles with RF signals, which have a plus/minus 90 degree phase difference.

7. The antenna system of claim 3, wherein each of the crossed monopoles is connected via a separate respective electrical contact to radio.

8. The antenna system of claim 1, wherein the driven element includes a helical element that is configured to achieve circular polarization.

9. The antenna system of claim 8, wherein the helical element is embedded in the respective dielectric rod.

10. An antenna system comprising:

a plurality of dielectric rod stacks;

a control circuit including a plurality of independently controlled output circuit boards, the control circuit further including a microcontroller and multiple radios and incorporating a PIN diode ring network to maximize switching speed and flexibility;

wherein each independently controlled output circuit board includes a respective dielectric rod stack, and the respective dielectric rod stack includes a plurality of respective dielectric rods;

wherein the control circuit selects: (i) the dielectric rod stacks, and (ii) the respective dielectric rods of the respective dielectric rod stack to adjust a beam of emitted or received radio frequency (RF) waves and achieve dual linear or circular polarization.

11. The antenna system of claim 10, wherein each of the multiple radios is connected to a respective radio input and output line.

12. The antenna system of claim 11, wherein the respective radio input and output line is connected to one respective independently controlled output circuit board.

13. The antenna system of claim 11, wherein the respective radio input and output line includes a coaxial cable and a semi-precision coaxial RF connector.

14. The antenna system of claim 13, wherein the semi-precision coaxial RF connector includes a subminiature version A (SMA).

15. The antenna system of claim 10, wherein the microcontroller incorporates beam management algorithms to provide signals to command activation of at least one of the dielectric rod stacks or at least one of the respective dielectric rods of the respective dielectric rod stack.

16. The antenna system of claim 10, wherein the microcontroller interfaces with one or more radios that provide communication protocols and signals for transmission/reception through the dielectric rods.

17. The antenna system of claim 10, wherein the control circuit includes a bias circuit that is connected to the microcontroller.

18. The antenna system of claim 17, wherein the bias circuit receives a multiplexed switching control signal from a microprocessor and demultiplexes the switching control signal into separate demultiplexed switching control signals for each independently controlled output circuit board.

19. The antenna system of claim 18, wherein each of the separate demultiplexed switching control signals is electrically conveyed to each of the independently controlled output circuit boards.

20. The antenna system of claim 10, wherein each of the respective dielectric rods is driven by a driven element.

* * * * *